(12) United States Patent
Sasaki et al.

(10) Patent No.: US 10,914,752 B2
(45) Date of Patent: Feb. 9, 2021

(54) SPECIMEN TRANSPORT APPARATUS, SPECIMEN MEASUREMENT APPARATUS, SPECIMEN TRANSPORT METHOD, AND HOLDER

(71) Applicant: SYSMEX CORPORATION, Kobe (JP)

(72) Inventors: Yuto Sasaki, Kobe (JP); Kazuki Asao, Kobe (JP); Kazuyuki Iguchi, Kobe (JP); Keiichiro Shohmi, Kobe (JP); Shoichiro Asada, Kobe (JP); Hiroaki Tobimatsu, Kobe (JP); Ryutaro Shinya, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 310 days.

(21) Appl. No.: 15/823,652

(22) Filed: Nov. 28, 2017

(65) Prior Publication Data
US 2018/0149667 A1 May 31, 2018

(30) Foreign Application Priority Data

Nov. 30, 2016 (JP) ................................. 2016-233700
Feb. 28, 2017 (JP) ................................. 2017-036219

(51) Int. Cl.
*G01N 35/02* (2006.01)
*B01L 9/00* (2006.01)
(Continued)

(52) U.S. Cl.
CPC ............ *G01N 35/026* (2013.01); *B01L 9/523* (2013.01); *G01N 35/04* (2013.01);
(Continued)

(58) Field of Classification Search
CPC ...... G01N 35/026; G01N 35/04; G01N 35/02; G01N 2035/042; G01N 2035/0465;
(Continued)

(56) References Cited

U.S. PATENT DOCUMENTS 3,985,507 A * 10/1976 Litz ........................ B65G 1/10
422/65
4,022,579 A * 5/1977 Revillet .................... B01L 9/06
422/65
(Continued)

FOREIGN PATENT DOCUMENTS

| JP | 2002-031642 | | 1/2002 |
|---|---|---|---|
| JP | 2003-083993 | A | 3/2003 |
| JP | 2013-156254 | A | 8/2013 |

*Primary Examiner* — Benjamin R Whatley
*Assistant Examiner* — Curtis A Thompson
(74) *Attorney, Agent, or Firm* — Metrolex IP Law Group, PLLC

(57) ABSTRACT

A specimen transport apparatus according to an embodiment includes: a holder including first and second trenches and configured to hold a specimen; a first transporter including a first protrusion to engage with the first trench and configured to transport the holder by transferring the first protrusion engaged with the first trench in an extension direction of the second trench; a second transporter including a second protrusion to engage with the second trench and configured to transport the holder by transferring the second protrusion engaged with the second trench in an extension direction of the first trench. The first trench is formed in at least one of an upper surface and a lower surface of the holder. The second trench is formed in at least one of the upper surface and the lower surface of the holder, and is formed to extend to a lateral surface of the holder.

22 Claims, 24 Drawing Sheets

(51) Int. Cl.
*G01N 35/04* (2006.01)
*B65B 7/28* (2006.01)

(52) U.S. Cl.
CPC . *B01L 2200/025* (2013.01); *B01L 2300/0829* (2013.01); *B65B 7/28* (2013.01); *G01N 35/02* (2013.01); *G01N 2035/042* (2013.01); *G01N 2035/0415* (2013.01); *G01N 2035/0465* (2013.01)

(58) Field of Classification Search
CPC ... G01N 2035/0415; B01L 9/523; B01L 9/00; B01L 2300/0829; B01L 2200/025; B65B 7/28
See application file for complete search history.

(56) References Cited

U.S. PATENT DOCUMENTS

| | | | | |
|---|---|---|---|---|
| 4,040,533 | A | * | 8/1977 | De Boer ............ B01L 9/06 414/416.05 |
| 5,897,835 | A | * | 4/1999 | Seaton ............ G01N 21/13 206/564 |
| 2015/0160249 | A1 | * | 6/2015 | Bucher ............ G01N 35/026 422/65 |

* cited by examiner

SPECIMEN TRANSPORT APPARATUS, SPECIMEN MEASUREMENT APPARATUS, SPECIMEN TRANSPORT METHOD, AND HOLDER

CROSS REFERENCE TO RELATED APPLICATIONS

This application claims priority from prior Japanese Patent Application No. 2016-233700, filed on Nov. 30, 2016 and Japanese Patent Application No. 2017-036219, filed on Feb. 28, 2017, the entire contents of which are incorporated herein by reference.

BACKGROUND

The disclosure relates to a specimen transport apparatus which transports a specimen, a specimen measurement apparatus which includes the specimen transport apparatus, a specimen transport method of transporting the specimen, and a holder which may be used for the specimen transport apparatus.

A transport system is known which transports a multiwell plate provided with an array of wells for storing specimens. For example, as illustrated in FIG. 24, Japanese Patent Application Publication No. 2002-31642 (Patent Literature 1) describes a configuration which passes over a multiwell plate 903 between a transport path 901 and an automatic sealer 902.

The multiwell plate 903 is passed over in the following manner. The multiwell plate 903 is positioned on second lifter members 904 of the transport path 901. The four second lifter members 904 ascend to a level slightly higher than a support plate 906 fixed to an arm member 905. A proximal end of the arm member 905 is connected to a rotation shaft 907 rotated by e.g. a not-illustrated motor. When the arm member 905 pivots and moves to a position under the multiwell plate 903, the second lifter members 904 descend to place the multiwell plate 903 on the support plate 906.

The arm member 905 pivots together with the multiwell plate 903 and moves to a position on top of first lifter members 909 provided to a base 908 of the automatic sealer 902. The four first lifter members 909 ascend to a level slightly higher than the support plate 906 and support the multiwell plate 903. The arm member 905 pivots to recede from under the multiwell plate 903. When the first lifter members 909 descend, the multiwell plate 903 is placed on a plate mount 910 provided on the base 908. In such a manner, the passing over of the multiwell plate 903 from the transport path 901 to the automatic sealer 902 is completed.

For the purpose of enhancing the accuracy of experiments or the like, the automatic sealer 902 seals an upper surface of the multiwell plate 903 with, for example, a reinstallable film or a permanent film so that exposure of samples in the wells provided in the multiwell plate 903 air and evaporation of liquid components in the samples can be minimized to a possible extent.

When the process by the automatic sealer 902 finishes, the multiwell plate 903 is unloaded from the automatic sealer 902, and stops moving on the first lifter members 909 of the plate mount 910. The four first lifter members 909 ascend to a level slightly higher than the support plate 906. When the arm member 905 pivots and moves to a position under the multiwell plate 903, the first lifter members 909 descend to place multiwell plate 903 on the support plate 906.

The arm member 905 pivots together with the multiwell plate 903 and moves to a position on top of the second lifter members 904. The four second lifter members 904 ascend to a level slightly higher than the support plate 906 and support the multiwell plate 903. The arm member 905 pivots to recede from under the multiwell plate 903. When the second lifter members 904 descend, the multiwell plate 903 is placed on the transport path 901. In such a manner, the passing over of the multiwell plate 903 from the automatic sealer 902 to the transport path 901 is completed.

SUMMARY

The configuration of Patent Literature 1 described above is an apparatus configuration complicated and large in size because the first lifter members 909 and the second lifter members 904 allow the multiwell plate 903 to ascend and descend, and the arm member 905 is pivoted to transport the multiwell plate 903.

An embodiment of the disclosure provides a specimen transport apparatus, a specimen measurement apparatus, a specimen transport method, and a holder which are capable of smoothly transporting a specimen along a two-dimensional plane with a simple configuration.

A first aspect of the disclosure relates to a specimen transport apparatus. A specimen transport apparatus according to the first aspect includes: a holder which includes a first trench and a second trench extending in a direction different from an extension direction of the first trench and which is configured to hold a specimen; a first transporter which includes a first protrusion to engage with the first trench and which is configured to transport the holder by transferring the first protrusion in engagement with the first trench in the extension direction of the second trench; a second transporter which includes a second protrusion to engage with the second trench and which is configured to transport the holder by transferring the second protrusion in engagement with the second trench in the extension direction of the first trench. The first trench is formed in at least one of an upper surface and a lower surface of the holder, and the second trench is formed in at least one of the upper surface and the lower surface of the holder, and is formed to extend to a lateral surface of the holder.

In the specimen transport apparatus according to the first aspect, when the first transporter transfers the first protrusion in the extension direction of the second trench, the first trench and the first protrusion engage with each other, and thereby the holder 500 receives a force in the extension direction of the second trench. At this moment, the second protrusion in engagement with the second trench can travel in the extension direction of the second trench along the second trench. Thus, the force applied due to the travel of the first protrusion transports the holder in the extension direction of the second trench. In addition, since the second trench is formed to extend to the lateral surface of the holder, if the holder travels in the extension direction of the second trench, the second protrusion enters the second trench to engage with the second trench. After the holder is transported in the extension direction of the second trench, when the second transporter transfers the second protrusion in the extension direction of the first trench, the second trench and the second protrusion engage with each other, and thereby the holder receives a force in the extension direction of the first trench. At this moment, the first protrusion in engagement with the first trench can travel in the extension direction of the first trench along the first trench. Thus, the force in the extension direction of the first trench applied due to the travel of the second protrusion transports the holder in the extension direction of the first trench.

In the specimen transport apparatus according to the first aspect, it is possible to smoothly transport the holder holding the specimen along the two-dimensional plane with a simple configuration employing engagement between the first trench and the first protrusion, and engagement between the second trench and the second protrusion. In addition, it is possible to return the holder to the position before the transport by causing the second protrusion to travel in the opposite direction and causing the first protrusion to travel in the opposite direction. Moreover, it is possible to increase the transport distance of the holder in the extension direction of the second trench because the second protrusion can be inserted and removed into and from the second trench in the extension direction of the second trench. Thus, the specimen transport apparatus according to the first aspect makes it possible to cause the holder to travel back and forth within a wide range with a simple configuration.

Here, the "first trench" and the "second trench" do not necessarily have to extend in directions perpendicular to each other. They only have to extend in directions not parallel to each other.

In the specimen transport apparatus according to the first aspect, the first trench may be configured to extend to a lateral surface of the holder such that the first protrusion slides out of the first trench in a transport operation to transport the holder in the extension direction of the first trench. Such a configuration makes it possible to further increase the transport distance of the holder in the extension direction of the first trench.

Additionally, the second trench may be configured to extend to the lateral surface of the holder such that the second protrusion slides out of the second trench in a transport operation to transport the holder in the extension direction of the second trench. Such a configuration makes it possible to further increase the transport distance of the holder in the extension direction of the second trench.

In this case, the width of the second trench may be increased, at least at an opened end portion of the second trench, toward the lateral surface of the holder in the extension direction of the second trench, wherein the lateral surface of the holder is formed with the opened end portion of the second trench through which the second trench is exposed to an outside of the holder in the extension direction of the second trench. In addition, the width of the first trench may be increased, at least at an opened end portion of the first trench, toward a lateral surface of the holder in the extension direction of the first trench, wherein the lateral surface of the holder is formed with the opened end portion of the first trench through which the first trench is exposed to an outside of the holder in the extension direction of the first trench. In such a configuration, it is possible to smoothly insert and remove the first protrusion or the second protrusion into and from the corresponding trench even when there is a misalignment between the first protrusion and the first trench or between the second protrusion and the second trench.

In the specimen transport apparatus according to the first aspect, the first trench and the second trench may be configured to be arranged in the lower surface of the holder. Such a configuration makes it possible to engage the trench and the protrusion with each other by placing the holder at a predetermined position on the transport path. Thus, it is possible to simplify the configuration of the specimen transport apparatus because a separate mechanism to cause the trench or the protrusion to travel for engagement is unnecessary.

In addition, the first protrusion may be configured to include a wide portion which has a width larger than a proximal side of the first protrusion, and the first trench may be configured to include a first width portion which receives the wide portion and a second width portion which is positioned opposite to the first width portion and near the proximal side of the first protrusion and which has a width smaller than the wide portion. Such a configuration makes it possible to prevent detachment of the holder within the travel area in the extension direction of the second trench.

Moreover, a shape of each of the first protrusion and the second protrusion when viewed in a protrusion direction of the protrusions may be circular. Such a configuration reduces the risk that the first protrusion is stuck in the first trench when the first protrusion enters the first trench, and reduces the risk that the second protrusion is stuck in the second trench when the second protrusion enters the second trench. As a result, it is possible to allow the first protrusion and the second protrusion to smoothly enter the first trench and the second trench, respectively.

In addition, the first protrusion and the second protrusion may each be configured to be rotatable in a circumferential direction. In such a configuration, when the first protrusion is about to enter the first trench, the first protrusion smoothly enters the first trench even if the first protrusion is stuck in the first trench because the first protrusion rotates. Similarly, when the second protrusion is about to enter the second trench, the second protrusion smoothly enters the second trench even if the second protrusion is stuck in the second trench because the second protrusion rotates.

The specimen transport apparatus according to the first aspect may be configured such that a portion of the first protrusion to be inserted into the first trench has a maximum width that is substantially the same as a width of the first trench, and a portion of the second protrusion to be inserted into the second trench has a maximum width that is substantially the same as a width of the second trench. In such a configuration, there is almost no clearance between the first protrusion and the first trench, and between the second protrusion and the second trench. As a result, it is possible to smoothly transport the holder and to enhance the positioning accuracy for the holder within the travel area.

In the specimen transport apparatus according to the first aspect, a travel path of the first protrusion and a travel path of the second protrusion may be set not to cross each other in a plan view. Thus, it is possible to arrange a drive mechanism for the first transporter and a drive mechanism for the second transporter individually without coming into contact with each other. Hence, it is possible to simplify the configurations of the first transporter and the second transporter.

The specimen transport apparatus according to the first aspect may be configured such that the holder includes a third trench which extends in the same direction as the second trench, and the specimen transport apparatus includes a third transporter which is configured to transport the holder by transferring a third protrusion in engagement with the third trench in the extension direction of the first trench. Here, the third trench extends to the lateral surfaces to which the second trench of the holder extends such that the third protrusion enters the third trench in a transport operation to transport the holder in the extension direction of the second trench using the first protrusion. This makes it possible to transport the holder to an area other than the transport area of the second transporter using the third transporter. Hence, it is possible to increase the transport area of the holder.

In this case, the first trench may be configured to extend to a lateral surface of the holder such that the first protrusion slides out of the first trench in a transport operation to transport the holder using the third protrusion. Such a configuration makes it possible for the third protrusion to increase the transport distance of the holder.

The specimen transport apparatus according to the first aspect may be configured to include a planar support surface which is provided in a travel range of the holder, and on which the lower surface of the holder is mounted. Such a configuration makes it possible to smoothly transport the holder.

In the specimen transport apparatus according to the first aspect, the holder may be configured such that a plate with wells formed in a matrix form is mountable on the upper surface. Such a configuration makes it possible to easily arrange the specimen in the holder.

In the specimen transport apparatus according to the first aspect, the wells in a matrix form may be formed in the upper surface of the holder. Such a configuration makes it possible to omit the plate.

In the specimen transport apparatus according to the first aspect, a hole to set a specimen container therein may be formed in the upper surface of the holder. Such a configuration makes it possible to simplify the operation because it is unnecessary to dispense the specimen stored in the specimen container into the wells of the plate.

In this case, it may be preferable that the upper surface of the holder includes an identification sign attached thereto to identify a type of the specimen in the specimen container set in the hole. Such a configuration makes it possible for the operator to know how to set a specimen container storing a specimen of a certain type in the correct hole of the holder.

In addition, if the specimen transport apparatus includes a plurality of the holders which are transported by the first transporter, it may be preferable that an identification sign which indicates order of transporting the holders is attached on an upper surface of each of the holders. Such a configuration makes it possible to know the correct processing order of the specimen container set in each of the holders.

In addition, the specimen transport apparatus may further include a cap holder that configured to hold a cap of the specimen container. In such a configuration, the operator may set the cap removed from the specimen container on the cap holder of the specimen transport apparatus, and thus may properly manage the cap removed from the specimen container.

The specimen transport apparatus according to the first aspect may be configured such that the extension direction of the first trench is substantially perpendicular to the extension direction of the second trench. In such a configuration, the driving force by the first transporter is efficiently transmitted to the first trench via the first protrusion because the first protrusion is transferred in a direction substantially perpendicular to the extension direction of the first trench after the first trench and the first protrusion engage with each other. Similarly, the driving force by the second transporter is efficiently transmitted to the second trench via the second protrusion because the second protrusion is transferred in a direction substantially perpendicular to the extension direction of the second trench after the second trench and the second protrusion engage with each other. Thus, it is possible to efficiently transmit the driving force by the first transporter and the second transporter to the holder.

The specimen transport apparatus according to the first aspect may be configured such that a plurality of the first protrusions are provided along the extension direction of the first trench, and a plurality of the second protrusions are provided along the extension direction of the second trench. Such a configuration makes it possible to stably push the first trench and the second trench with the first protrusions and the second protrusions.

In the specimen transport apparatus according to the first aspect, the holder may be formed of polyacetal. Polyacetal has a small frictional resistance on a stainless-steel sheet or an electrolytic zinc-coated steel sheet. For this reason, if the support surface mounted with the holder is formed of a stainless-steel sheet or an electrolytic zinc-coated steel sheet, it is possible to smoothly transport the holder on the support surface.

A second aspect of the disclosure relates to a specimen measurement apparatus. The specimen measurement apparatus according to the second aspect includes: the specimen transport apparatus according to the first aspect; an aspiration unit which aspirates the specimen transported by the holder; and a measurement unit which measures the specimen aspirated by the aspiration unit.

The specimen measurement apparatus according to the second aspect provides the same effects as those of the first aspect.

In this case, the holder may be formed with wells in which the specimen can be store such that the wells are arranged in the extension direction of the second trench and in the extension direction of the first trench in a matrix form, the aspiration unit may include an aspiration tube which aspirates the specimen and a transfer unit which transfers the aspiration tube in the extension direction of the second trench, and the specimen transport apparatus may align the wells arrayed in the extension direction of the second trench with a transfer path of the aspiration tube by transporting the holder using the first transporter and the second transporter. Since the specimen measurement apparatus according to the second aspect is configured such that the specimen transport apparatus according to the first aspect transports the holder, it is possible to accurately transport the holder in the extension direction of the first trench. Thus, it is possible to accurately position the line of the wells in the extension direction of the second trench on the travel path of the aspiration tube. Hence, it is possible to properly aspirate the specimen from the wells.

A third aspect of the disclosure relates to a specimen transport apparatus to transport a specimen along a two-dimensional plane in a first direction and a second direction. The specimen transport apparatus according to the third aspect includes: a holder which holds the specimen; a first transporter which is configured to transport a first travel unit in the first direction; and a second transporter which is configured to transport a second travel unit in the second direction. Here, a first gap extending in the second direction is arranged in one of the holder and the first travel unit, and a first protrusion to engage with the first gap is provided on the other of the holder and the first travel unit. In addition, a second gap extending in the first direction is arranged in one of the holder and the second travel unit, and a second protrusion to engage with the second gap is provided on the other of the holder and the second travel unit. The second gap and the second protrusion are arranged at positions where the second gap and the second protrusion engage with each other in transporting the holder in the first direction, and the second gap penetrates a lateral surface on the first direction side of the holder or a lateral surface on the opposite side in the first direction of the second travel unit such that the second protrusion enters the second gap in a transport operation to transport the holder in the first direction.

The specimen transport apparatus according to the third aspect provides the same effects as those of the first aspect.

Note that the "first gap" and the "second gap" do not necessarily have to be formed by two surfaces facing each other. For example, each of the first gap and the second gap may be formed by two line-shaped parts facing each other. Moreover, each of the "first gap" and the "second gap" may be an opening without a bottom, not a trench with a bottom, for example.

A fourth aspect of the disclosure relates to a specimen transport method. The specimen transport method according to the fourth aspect includes: transporting a holder holding a specimen in an extension direction of a second trench provided in an upper surface or a lower surface of the holder by causing a first protrusion to travel in the extension direction of the second trench with the first protrusion engaged with a first trench provided in the upper surface or the lower surface of the holder and thereby inserting the second protrusion into the second trench along the extension direction of the second trench; and, transporting the holder in an extension direction of the first trench by causing the second protrusion to travel in the extension direction of the first trench.

The specimen transport method according to the fourth aspect provides the same effects as those of the first aspect.

In the specimen transport method according to the fourth aspect, it may be preferable that in the transporting the holder in the extension direction of the first trench, the first protrusion slides out of the first trench. Such a configuration makes it possible to increase the transport distance of the holder in the extension direction of the first trench.

A fifth aspect of the disclosure relates to a holder to hold a specimen. The holder according to the fifth aspect includes a lower surface which includes a first trench; and a second trench extending in a direction different from an extension direction of the first trench. Here, the first trench extends to at least one lateral surface of the holder, and the second trench extends to at least one lateral surface of the holder.

According to the holder of the fifth aspect, use of this holder provides the same effects as those of the first aspect.

The above-described aspects make it possible to smoothly transport the specimen along the two-dimensional plane.

DETAILED DESCRIPTION

Figure 1A:
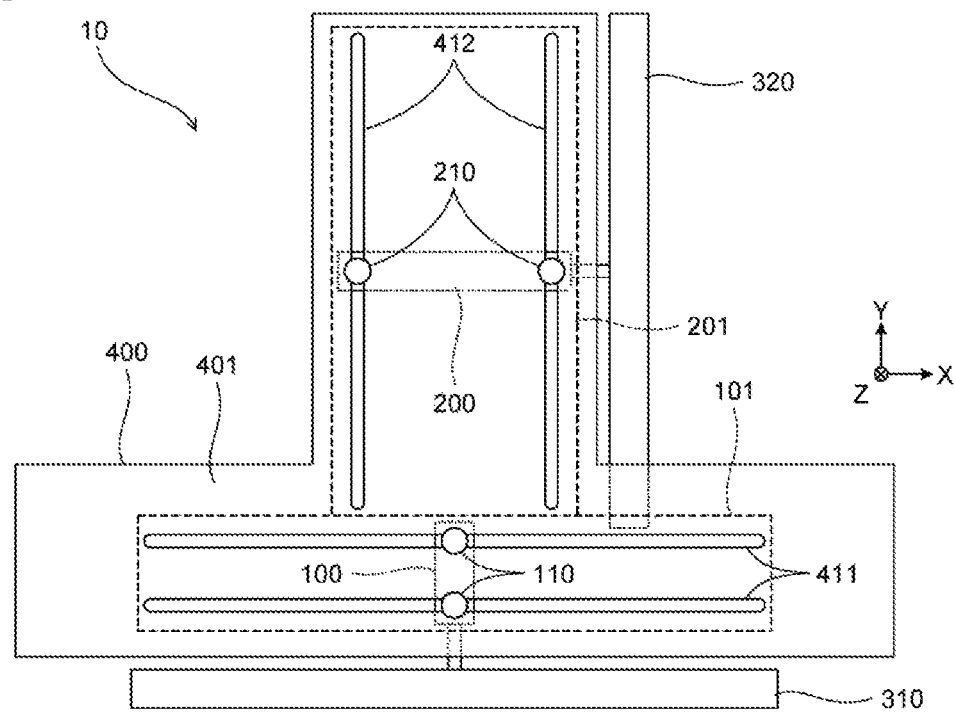
FIG. 1A is a schematic diagram illustrating a configuration where a specimen transport apparatus according to Embodiment 1 is viewed downward in a vertical direction.

Embodiments are explained with reference to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on one or more embodiments. For this reason, specific dimensions and the like should be interpreted with the following descriptions taken into consideration. In addition, the drawings may include parts whose dimensional relationship and ratios are different from one drawing to another.

Embodiment 1

As illustrated in FIG. 1A, a specimen transport apparatus 10 includes a first travel unit 100, a second travel unit 200, a first transporter 310, a second transporter 320, and a support plate 400. The support plate 400 is, for example, a stainless-steel sheet or an electrolytic zinc-coated steel sheet (SECC). The specimen transport apparatus 10 transports a specimen along a two-dimensional plane. In Embodiment 1, the specimen transport apparatus 10 transports the specimen along an XY-plane. In FIG. 1A, X-, Y-, and Z-axes are orthogonal to one another. The XY-plane is a horizontal plane, and a positive Z-axis direction points downward in a vertical direction. In the subsequent drawings, the X-, Y-, and Z-axes are the same as the X-, Y-, and Z-axes of FIG. 1A. Note that a positive X-axis direction corresponds to a first direction, and a positive Y-axis direction corresponds to a second direction.

Figure 1B:
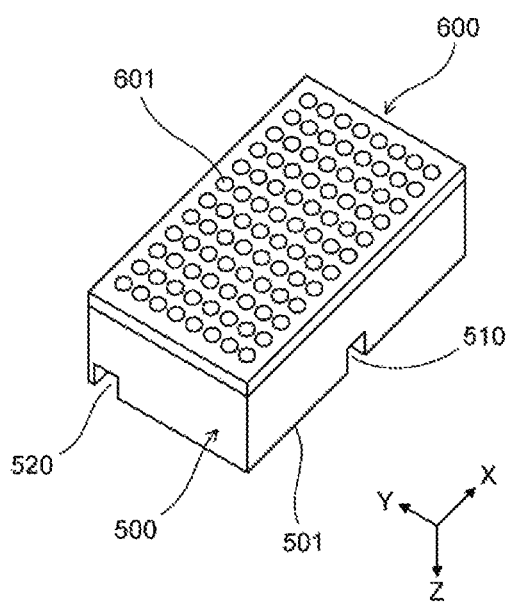
FIGS. 1B and 1C are schematic diagrams illustrating configurations where a holder on which a plate according to Embodiment 1 is set is viewed from above and from below, respectively.

As illustrated in FIG. 1B, the specimen transport apparatus 10 further includes a holder 500. The holder 500 is configured such that the holder 500 can set a plate 600 on an upper surface thereof. The plate 600 has wells 601 formed therein in a matrix form. To be more specific, eight lines of twelve wells 601 in an X-axis direction are arrayed in a Y-axis direction, and 96 wells 601 in total are formed in the plate 600. The distance between the centers of adjacent wells 601 is 9 mm, and the diameter of an upper end portion of each well 601 is 5.5 mm. An operator stores a specimen in each well 601, and sets the plate 600 holding the specimens on the upper surface of the holder 500. In such a manner, the holder 500 holds the specimens in the plate 600. If the holder 500 has a configuration which enables the setting of the plate 600 on the upper surface thereof, the operator is allowed to easily arrange the specimens on the holder 500.

The holder 500 is formed of, for example, polyacetal. In general, polyacetal has a small frictional resistance on a stainless-steel sheet or an electrolytic zinc-coated steel sheet (SECC) being a material for the support plate 400. For this reason, if the holder 500 is formed of polyacetal, it is possible to smoothly transport the holder 500 on a support surface 401 of the support plate 400. The holder 500 is preferably made of a resin material which is easily casted and which has a small frictional resistance on the support surface 401.

Figure 1C:
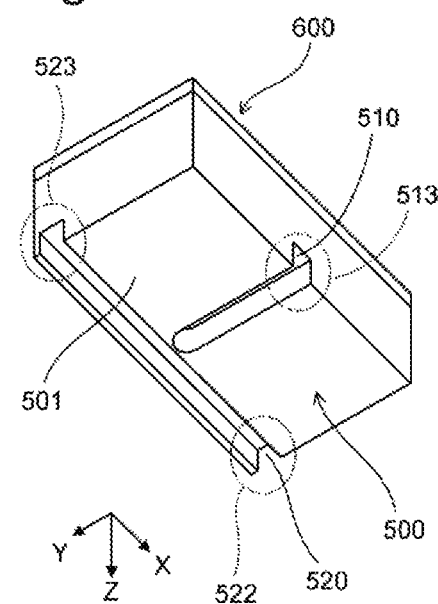

As illustrated in FIGS. 1B and 1C, a first trench 510 and a second trench 520 are arranged in the lower surface 501 of the holder 500. The first trench 510 extends parallel to the Y-axis direction and is a groove formed in the lower surface 501. The second trench 520 extends parallel to the X-axis direction and is a groove formed in the lower surface 501. If the first trench 510 and the second trench 520 are each a groove, it is possible to easily create the first trench 510 and the second trench 520 in the holder 500. The first trench 510 is arranged to pass through the middle position in the X-axis direction of the lower surface 501. The second trench 520 is arranged to pass near the edge portion on the positive Y-axis side of the lower surface 501.

Back to FIG. 1A, the first transporter 310 includes the first travel unit 100 and first protrusions 110, and transports the first protrusions 110 together with the first travel unit 100 in the X-axis direction. The second transporter 320 includes the second travel unit 200 and second protrusions 210, and transports the second protrusions 210 together with the second travel unit 200 in the Y-axis direction. The first travel unit 100 and the second travel unit 200 are positioned on the lower surface side, that is, on the positive Z-axis side of the support plate 400. The first travel unit 100 is provided with a pair of first protrusions 110, and the second travel unit 200 is provided with a pair of second protrusions 210. The pair of first protrusions 110 are arranged in the Y-axis direction on the first travel unit 100, and the pair of second protrusions 210 are arranged in the X-axis direction on the second travel unit 200. The first protrusions 110 engage with the first trench 510, and the second protrusions 210 engage with the second trench 520.

A travel path 101 of the first travel unit 100 and a travel path 201 of the second travel unit 200 are set such that when viewed in a Z-axis direction, they do not cross each other. Thus, it is possible to arrange a drive mechanism for the first transporter 310 and a drive mechanism for the second transporter 320 individually without coming into contact with each other. Hence, it is possible to simplify the configurations of the first transporter 310 and the second transporter 320.

The support surface 401 is the upper surface of the support plate 400 formed in a planar shape. The support surface 401 is mounted with the lower surface 501 of the holder 500 within the travel area of the holder 500. Thus, it is possible to smoothly transport the holder 500 on the support surface 401 while supporting the holder 500 on the support surface 401. Note that the lower surface 501 of the holder 500 may float above the support surface 401 while being supported only by the first protrusions 110 and the second protrusions 210.

A pair of first grooves 411 and a pair of second grooves 412 are formed in the support plate 400. The pair of first grooves 411 extend in the X-axis direction, and the pair of second grooves 412 extend in the Y-axis direction. The pair of first protrusions 110 protrude upward from the support surface 401 through the pair of first grooves 411. The pair of second protrusions 210 protrude upward from the support surface 401 through the pair of second grooves 412.

Next, with reference to FIG. 2A to FIG. 3B, the transport of the holder 500 is described. Note that in FIG. 2A to FIG. 3B, illustration is omitted of the first travel unit 100, the second travel unit 200, the first transporter 310, the second transporter 320, and the plate 600 for convenience.

Here, a position 421 is defined as the position of the holder 500 when the holder 500 is positioned at an end portion on the negative X-axis side of the support surface 401. A position 424 is defined as the position of the holder 500 when the holder 500 is positioned at an end portion on the positive X-axis side of the support surface 401. A position 422 is defined as the position of the holder 500 when the holder 500 is positioned in the middle between the position 421 and the position 424. A position 423 is defined as the position of the holder 500 when the holder 500 is positioned at an end portion on the positive Y-axis side of the support surface 401.

Figure 2A:
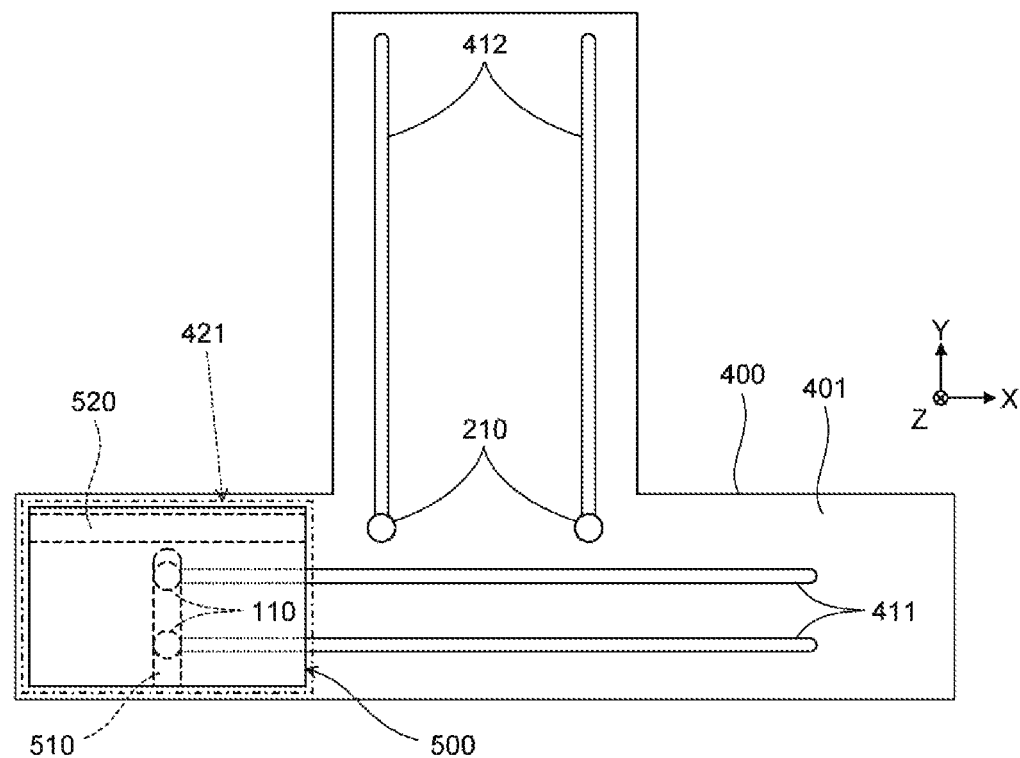
FIGS. 2A and 2B are schematic diagrams for explaining transport of the holder according to Embodiment 1.

As illustrated in FIG. 2A, the holder 500 is disposed on the support surface 401 such that the pair of first protrusions 110 positioned at the end portion on the negative X-axis side of the first grooves 411 engage with the first trench 510. Thus, the holder 500 is positioned at the position 421. Here, the first protrusions 110 are fitted into the first trench 510, and the lower surface 501 of the holder 500 is supported by the support surface 401. Subsequently, the second protrusions 210 are positioned at an end portion on the negative Y-axis side of the second grooves 412.

Figure 2B:
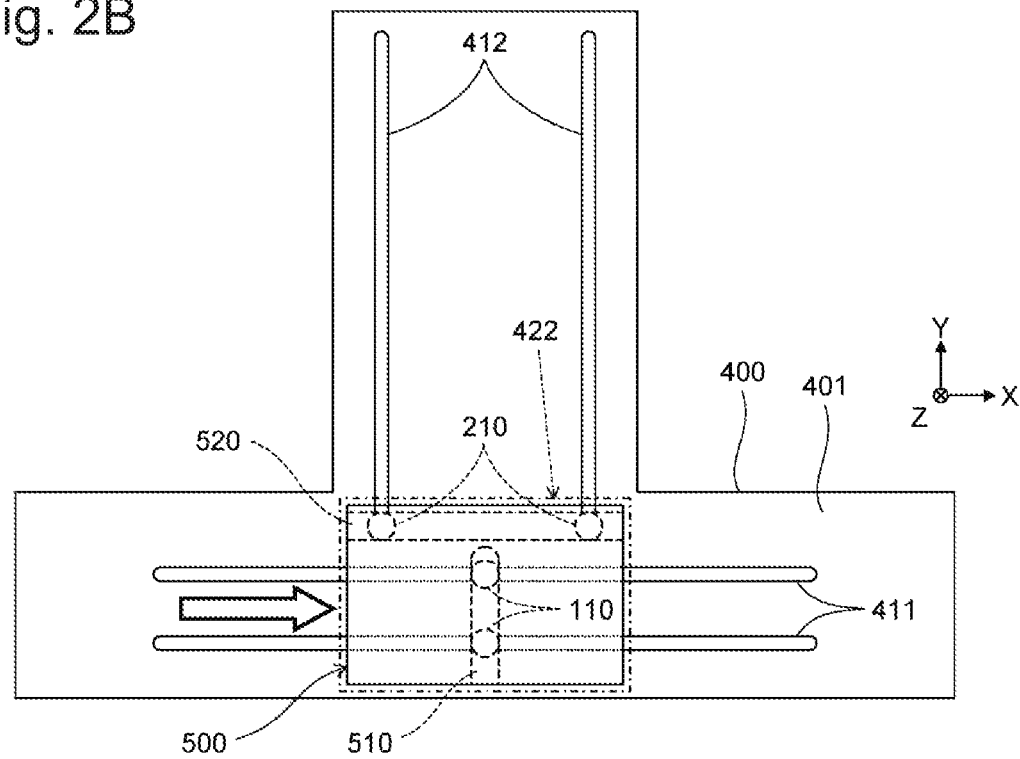

The first protrusions 110 travel in the positive X-axis direction from the state of FIG. 2A. Then, the first protrusions 110 push a wall on the positive X-axis side of the first trench 510, and the holder 500 is transported in the positive X-axis direction. Here, when the holder 500 reaches the positions of the second protrusions 210, the second protrusions 210 slide into the second trench 520 from the end portion on the positive X-axis side of the second trench 520. When the first protrusions 110 travel to the middle position in the X-axis direction of the first grooves 411, the pair of second protrusions 210 are fitted into the second trench 520, as illustrated in FIG. 2B. In such a manner, the holder 500 is positioned at the position 422.

Figure 3A:
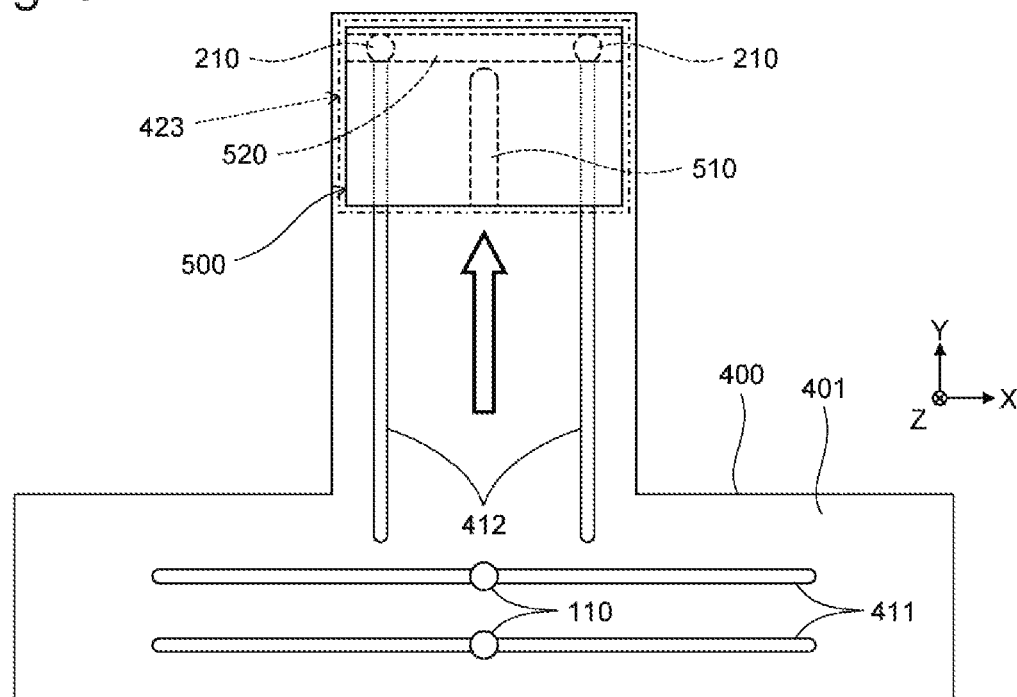
FIGS. 3A and 3B are schematic diagrams for explaining the transport of the holder according to Embodiment 1.

Subsequently, the second protrusions 210 travel in the positive Y-axis direction from the state of FIG. 2B. Then, the second protrusions 210 push a wall on the positive Y-axis side of the second trench 520, and the holder 500 is transported in the positive Y-axis direction. Here, the first protrusions 110 are pulled out of the holder 500 from the end portion on the negative Y-axis side of the first trench 510 along with the travel of the holder 500. When the second protrusions 210 travel to the end portion on the positive Y-axis side of the second grooves 412, the holder 500 is positioned at the position 423, as illustrated in FIG. 3A.

Figure 3B:
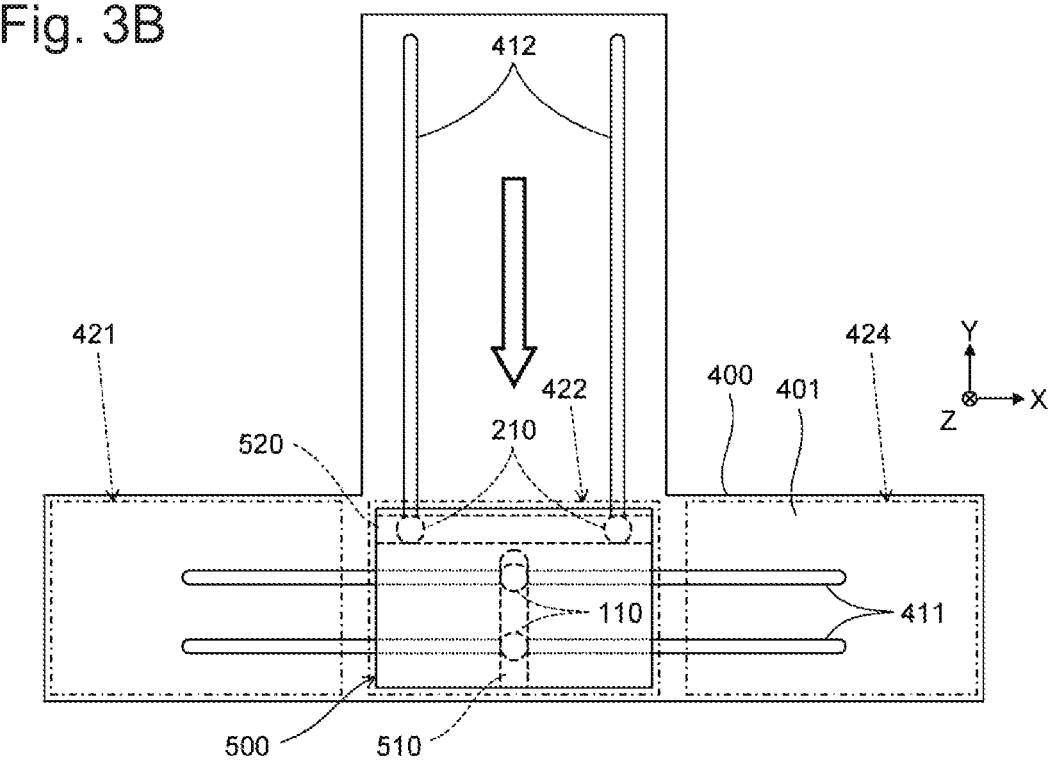

Subsequently, the second protrusions 210 travel in the negative Y-axis direction from the state of FIG. 3B. Then, the second protrusions 210 push a wall on the negative Y-axis side of the second trench 520, and the holder 500 is transported in the negative Y-axis direction. Here, when the holder 500 reaches the positions of the first protrusions 110, the first protrusions 110 slide into the first trench 510 from the end portion on the negative Y-axis side of the first trench 510. When the second protrusions 210 travel to the end portion on the negative Y-axis side of the second grooves 412, the pair of first protrusions 110 are fitted into the first trench 510, as illustrated in FIG. 3B. In such a manner, the holder 500 is positioned again at the position 422.

After that, the first protrusions 110 travel in a negative X-axis direction. Then, the first protrusions 110 push a wall on the negative X-axis side of the first trench 510, and the holder 500 is transported in the negative X-axis direction. Here, the second protrusions 210 are pulled out of the holder 500 from the end portion on the positive X-axis side of the second trench 520 along with the travel of the holder 500. When the first protrusions 110 travel to the end portion on the negative X-axis side of the first grooves 411, the holder 500 is positioned at the original position 421. Note that the first protrusions 110 may travel in the positive X-axis direction from the state of FIG. 3B. In this case, the second protrusions 210 are pulled out of the holder 500 from the end portion on the negative X-axis side of the second trench 520. Then, the holder 500 is positioned at the position 424.

As described above, when the first transporter 310 transports the first travel unit 100 in the positive X-axis direction, the first trench 510 and the first protrusions 110 engage with each other, and thereby the holder 500 receives a force in the positive X-axis direction. At this moment, since the second trench 520 extends in the X-axis direction, the second protrusions 210 in engagement with the second trench 520 can travel in the X-axis direction along the second trench 520. Thus, the force in the positive X-axis direction applied due to the travel of the first travel unit 100 allows the holder 500 to travel in the positive X-axis direction.

In addition, when the second transporter 320 transports the second travel unit 200 in the positive Y-axis direction, the second trench 520 and the second protrusions 210 engage with each other, and thereby the holder 500 receives a force in the positive Y-axis direction. At this moment, since the first trench 510 extends in the Y-axis direction, the first protrusions 110 in engagement with the first trench 510 can travel in the Y-axis direction along the first trench 510. Thus, the force in the positive Y-axis direction applied due to the travel of the second travel unit 200 allows the holder 500 to travel in the positive Y-axis direction.

As described above, the specimen transport apparatus 10 makes it possible to smoothly transport the holder 500 holding specimens along the XY-plane with a simple configuration which uses the engagement between the first trench 510 and the first protrusions 110 and the engagement between the second trench 520 and the second protrusions 210.

The second transporter 320 transports the second travel unit 200 in the Y-axis direction. However, the embodiment is not limited to this. The second transporter 320 may transport the second travel unit 200 in a direction which forms an angle with the X-axis direction and the Y-axis direction within the XY-plane. In other words, the second transporter 320 may transport the second travel unit 200 in a direction different from the X-axis direction and the Y-axis direction within the XY-plane. In this case, the extension direction of the second grooves 412, the extension direction of the first trench 510, and the arrangement direction of the pair of first protrusions 110 are parallel to the transport direction of the second travel unit 200. As a result, the holder 500 is transported by the first travel unit 100 in the X-axis direction, and is transported by the second travel unit 200 in a direction different from the X-axis direction and the Y-axis direction.

Note that the transport direction of the second travel unit 200 is preferably substantially perpendicular to the transport direction of the first travel unit 100. In such a configuration, the driving force by the first transporter 310 is efficiently transmitted to the first trench 510 via the first protrusions 110 because the first protrusions 110 travel in a direction substantially perpendicular to the extension direction of the first trench 510 after the first trench 510 and the first protrusions 110 engage with each other. Similarly, the driving force by the second transporter 320 is efficiently transmitted to the second trench 520 via the second protrusions 210 because the second protrusions 210 travel in a direction substantially perpendicular to the extension direction of the second trench 520 after the second trench 520 and the second protrusions 210 engage with each other. Thus, it is possible to efficiently transmit the driving force by the first transporter 310 and the second transporter 320 to the holder 500.

Specific Configuration

Next, the configuration illustrated in FIG. 1A to FIG. 3B is described in further detail.

Figure 4:
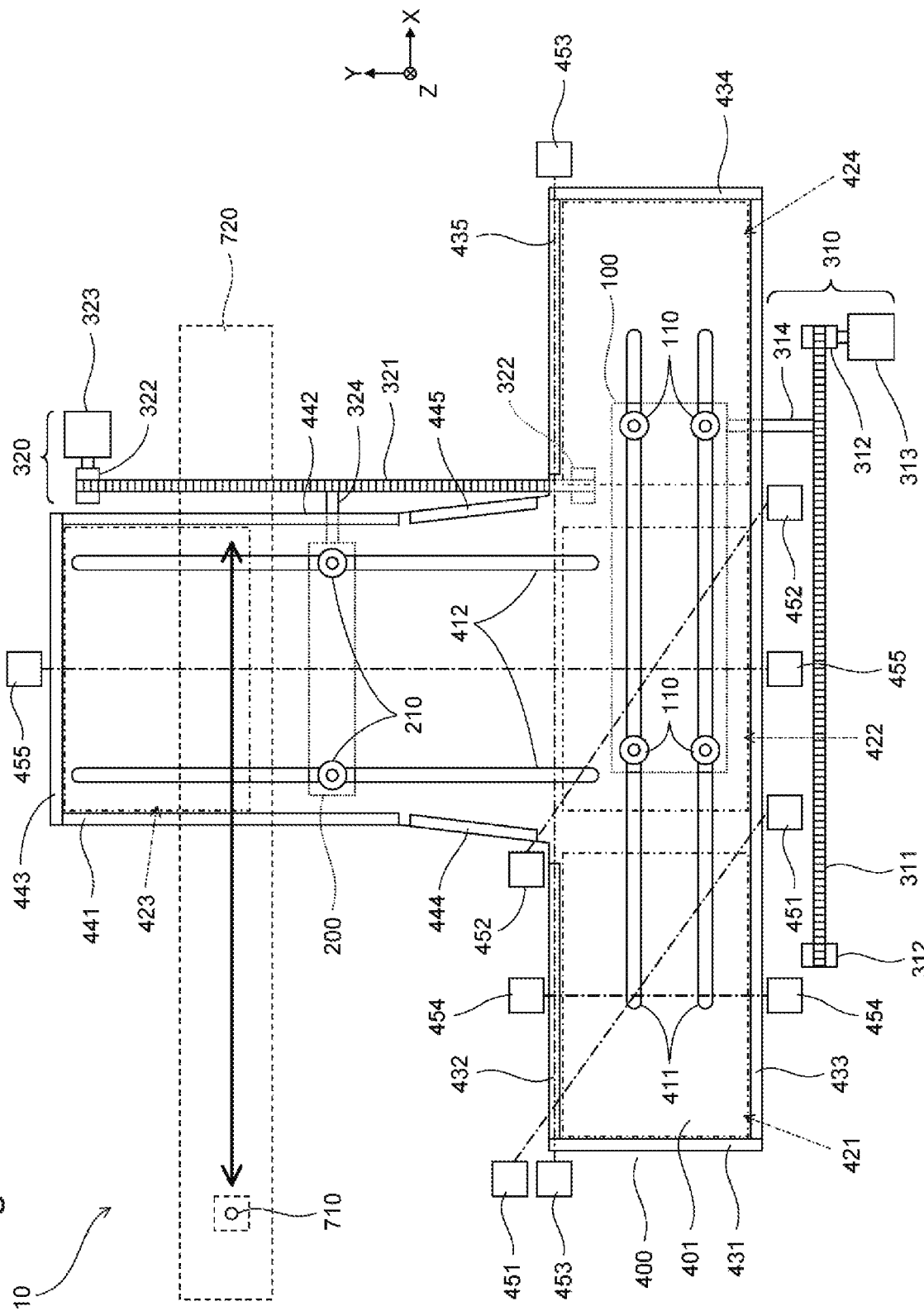
FIG. 4 is a schematic diagram illustrating a configuration where the specimen transport apparatus according to Embodiment 1 is viewed downward in the vertical direction.

As illustrated in FIG. 4, the first travel unit 100 has a shape long in the X-axis direction. Pairs of first protrusions 110 are arranged near the edge portion on the positive X-axis side of the first travel unit 100 and near the edge portion on the negative X-axis side of the first travel unit 100, respectively. Two holders 500 are arranged on the support surface 401. The two pairs of first protrusions 110 make it possible to transport the two holders 500 at the same time in the X-axis direction.

The first transporter 310 includes a belt 311, two pulleys 312, a motor 313, and a fastener 314. The belt 311 is wound around the two pulleys 312. The two pulleys 312 are arranged adjacent to each other in the X-axis direction at a predetermined interval. The pulley 312 on the positive X-axis side is connected to a drive shaft of the motor 313. The motor 313 is a stepper motor. The first travel unit 100 is configured such that it can travel in the X-axis direction while being supported by a not-illustrated rail. The first travel unit 100 is connected to the belt 311 with the fastener 314.

Similarly, the second transporter 320 includes a belt 321, two pulleys 322, a motor 323, and a fastener 324. The belt 321 is wound around the two pulleys 322. The two pulleys 322 are arranged adjacent to each other in the Y-axis direction at a predetermined interval. The pulley 322 on the positive Y-axis side is connected to a drive shaft of the motor 323. The motor 323 is a stepper motor. The second travel unit 200 is connected to the belt 321 with the fastener 324.

The support plate 400 includes wall parts 431 to 435 and 441 to 445 around the support surface 401. The wall parts 431 to 433 surround three lateral surfaces of the holder 500 positioned at the position 421. The wall parts 433 to 435 surround three lateral surfaces of the holder 500 positioned at the position 424. The wall parts 441 to 443 surround three lateral surfaces of the holder 500 positioned at the position 423. As described above, the holder 500 is surrounded by three wall parts at the positions 421, 423, and 424. As a result, the holder 500 on the support surface 401 is securely positioned at the positions 421, 423, and 424.

Near the position 423 in particular, the wall parts 441 and 442 determine the position of the holder 500 in the X-axis direction. This allows the position of each well 601 of the plate 600 set on the holder 500 to coincide with the aspiration position of a later-described aspiration tube 710 in the aspiration of specimens by the aspiration tube 710. Thus, it is possible to aspirate specimens appropriately with the aspiration tube 710.

The wall parts 444 and 445 are provided between the position 422 and the position 423. The distance between the wall part 444 and the wall part 445 in the X-axis direction changes, in a direction from the position 422 toward the position 423, from a width larger than the width in the X-axis direction of the holder 500 to a width almost the same as the width in the X-axis direction of the holder 500. In such a configuration, the wall parts 444 and 445 gradually align the position in the X-axis direction of the holder 500 with the position in the X-axis direction of the position 423 even if the position in the X-axis direction of the holder 500 is misaligned when the holder 500 is being transported from the position 422 to the position 423. Thus, it is possible to smoothly transfer the holder 500 from the position 422 to the position 423.

The specimen transport apparatus 10 further includes pairs of sensors 451 to 455. The pairs of sensors 451 to 455 are each a through-beam sensor which has a transmitter and a receiver. The pair of sensors can detect a shutting state or a transmitting state.

The pair of sensors 451 are used to detect whether or not the plate 600 on the holder 500 positioned at the position 421 is properly set on the holder 500. To be more specific, if the direction of the plate 600 set on the holder 500 is incorrect, the plate 600 on the holder 500 is positioned at a position higher than the case where the plate 600 is properly set, as described later. The pair of sensors 451 are set in the specimen transport apparatus 10 such that they change to the transmitting state if the plate 600 is properly set and change to the shutting state if the plate 600 is incorrectly set. Thus, it is possible to detect whether or not the plate 600 on the holder 500 at the position 421 is properly set on the holder 500 based on a detection signal of the pair of sensors 451.

The pair of sensors 452 are set in the specimen transport apparatus as in the case of the pair of sensors 451. The pair of sensors 452 are used to detect whether or not the plate 600 on the holder 500 at the position 422 is properly set on the holder 500.

The pair of sensors 453 are used to detect the holder 500 travelling between the position 422 and the position 423. The pair of sensors 453 change to the shutting state if the holder 500 is within an area displaced by a predetermined distance from the position 422 to the position 423, and change to the transmitting state if the holder 500 exits this area to the position 423 side. Thus, it is possible to detect whether or not the holder 500 is positioned within the area displaced by the predetermined distance from the position 422 to the position 423 based on a detection signal of the pair of sensors 453.

The pair of sensors 454 are used to detect whether or not the plate 600 is set on the holder 500 positioned at the position 421. To be more specific, the holder 500 includes a pair of holes 504 penetrating in the Y-axis direction, as described later. The pair of sensors 454 are set in the specimen transport apparatus 10 such that they change to the shutting state due to the plate 600 if the plate 60 is set on the holder 500 at the position 421 and change to the transmitting state if the plate 600 is not set on the holder 500 at the position 421. Thus, it is possible to detect whether or not the plate 600 is set on the holder 500 at the position 421 based on a detection signal of the pair of sensors 454.

The pair of sensors 455 are set in the specimen transport apparatus as in the case of the pair of sensors 454. The pair of sensors 455 are used to detect whether or not the plate 600 is set on the holder 500 at the position 422.

A treatment apparatus 20 to be described later with reference to FIG. 9 includes the aspiration tube 710 and a transfer unit 720 which transfers the aspiration tube 710 in the X-axis direction and the Z-axis direction. The travel path in the X-axis direction of the aspiration tube 710 is set so that specimens can be aspirated from all of the wells 601 of the plate 600 set on the holder 500. To be more specific, the travel path in the X-axis direction of the aspiration tube 710 is set such that when the holder 500 is positioned on the most positive Y-axis side, the travel path overlaps the position in the XY-plane of a line of twelve wells 601 in the X-axis direction within the edge portion on the negative Y-axis side of the plate 600. Thus, when the holder 500 travels in the Y-axis direction, the aspiration tube 710 can aspirate the specimens in all of the wells 601. In addition, the travel path in the X-axis direction of the aspiration tube 710 is set so as to overlap an external position 21 of the treatment apparatus 20 illustrated in FIG. 9. The configuration of the transfer unit 720 is described later with reference to FIGS. 8A to 8C.

Figure 5A:
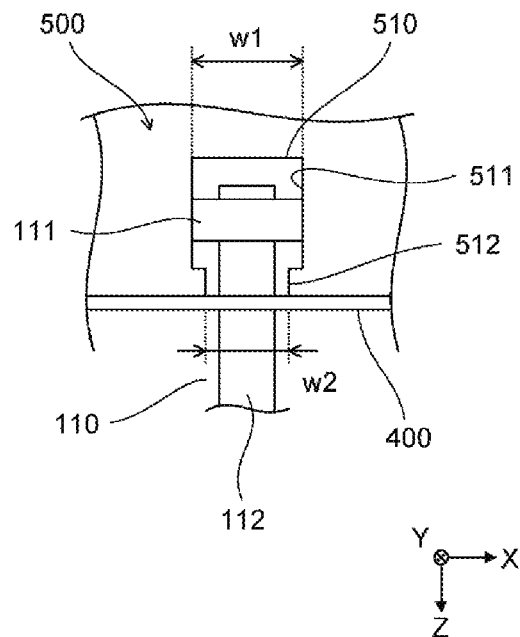
FIG. 5A is a schematic diagram illustrating a configuration where a first protrusion and a first trench according to Embodiment 1 are viewed in a positive Y-axis direction.

As illustrated in FIG. 5A, each of the first protrusions 110 includes a wide portion 111 which is wider than the proximal side, i.e., the positive Z-axis side thereof. The shape of the first protrusion 110 when viewed in the protrusion direction, i.e., the Z-axis direction is circular. The first protrusion 110 is configured such that it can rotate in a peripheral direction. The maximum width of the portion of the first protrusion 110 to be inserted into the first trench 510 is substantially the same as the width of the first trench 510.

To be more specific, the first protrusion 110 includes the wide portion 111 and a shaft member 112. The shaft member 112 extends in the Z-axis direction. The end portion on the positive Z-axis side of the shaft member 112 is set on the first travel unit 100. The wide portion 111 is set on the end portion on the negative Z-axis side of the shaft member 112 so that it can rotate about the shaft member 112. The shape of the wide portion 111 when viewed in the Z-axis direction is circular. The wide portion 111 is a roller.

The first trench 510 includes a first width portion 511 which receives the wide portion 111 and a second width portion 512 which is positioned near the proximal side of the first protrusion 110 compared to the first width portion 511 and which is narrower than the wide portion 111. The first width portion 511 extends in the Y-axis direction and includes a pair of walls parallel to the YZ-plane. The second width portion 512 extends in the Y-axis direction and includes a pair of walls parallel to the YZ-plane. The first width portion 511 contains the position of the wide portion 111 in the Z-axis direction. The second width portion 512 is positioned on the positive Z-axis side of the wide portion 111 in the Z-axis direction.

The width of the first width portion 511, i.e., the distance between the pair of walls constituting the first width portion 511 is denoted by w1. The width of the second width portion 512, i.e., the distance between the pair of walls constituting the second width portion 512 is denoted by w2. The relationship between w1 and w2 is w1>w2. The diameter of the wide portion 111 is w1 or less, and greater than w2. To be more specific, the width of the first width portion 511 is set to 9.2 mm, and the diameter of the wide portion 111 is set to 9.0 mm, which is almost the same as w1. The diameter of the shaft member 112 is smaller than w2. The above-described configuration of the first protrusions 110 and the first trench 510 makes it possible to prevent detachment of the holder 500 within the travel area in the X-axis direction.

Figure 5B:
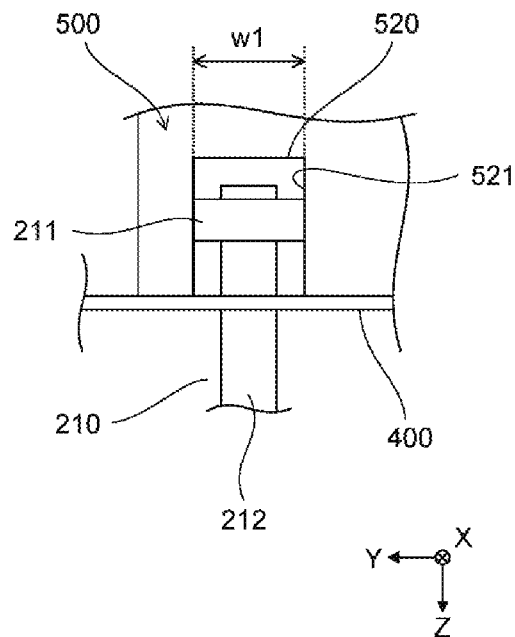
FIG. 5B is a schematic diagram illustrating a configuration where a second protrusion and a second trench according to Embodiment 1 are viewed in a positive X-axis direction.

As illustrated in FIG. 5B, each of the second protrusions 210 includes a wide portion 211 which is wider than the proximal side, i.e., the positive Z-axis side thereof, as in the case of the first protrusions 110. The shape of the second protrusion 210 when viewed in the protrusion direction, i.e., the Z-axis direction is circular. The second protrusion 210 is configured such that it can rotate in a peripheral direction. The maximum width of the portion of the second protrusion 210 to be inserted into the second trench 520 is substantially the same as the width of the second trench 520.

To be more specific, the second protrusion 210 includes the wide portion 211 and a shaft member 212. The shaft member 212 extends in the Z-axis direction. The end portion on the positive Z-axis side of the shaft member 212 is set on the second travel unit 200. The wide portion 211 is set on the end portion on the negative Z-axis side of the shaft member 212 so that it can rotate about the shaft member 212. The shape of the wide portion 211 when viewed in the Z-axis direction is circular. The wide portion 211 is a roller.

The second trench 520 includes a first width portion 521 which receives the wide portion 211. The first width portion 521 extends in the X-axis direction and includes a pair of walls parallel to the XZ-plane. The width of the first width portion 521, i.e. the distance between the pair of walls constituting the first width portion 521 is denoted by w1. The diameter of the wide portion 211 is w1 or less. To be more specific, the width of the first width portion 521 is set to 9.2 mm, and the diameter of the wide portion 211 is set to 9.0 mm, which is almost the same as w1. The diameter of the shaft member 212 is smaller than w1. The above-described configuration of the second protrusions 210 and the second trench 520 makes it possible to detach the holder 500 within the travel area in the Y-axis direction.

Note that the second trench 520 may also include a second width portion which is narrower than the wide portion 211 as in the case of the first trench 510. In this case, it is possible to prevent detachment of the holder 500 also within the travel area in the Y-axis direction. Conversely, if the second trench 520 does not include the second width portion, it is possible to easily detach the holder 500 from the specimen transport apparatus 10 within the travel area in the Y-axis direction.

As described with reference to FIGS. 5A and 5B, the shapes of the first protrusions 110 and the second protrusions 210 when viewed in the protrusion direction are circular. This reduces the risk that the first protrusions 110 are stuck in the first trench 510 when the first protrusions 110 enter the first trench 510, and reduces the risk that second protrusions 210 are stuck in the second trench 520 when the second protrusions 210 enter the second trench 520. As a result, it is possible to allow the first protrusions 110 and the second protrusions 210 to smoothly enter the first trench 510 and the second trench 520, respectively.

In addition, as described with reference to FIGS. 5A and 5B, the first protrusions 110 and the second protrusions 210 are configured such that they can rotate in the peripheral direction. In such a configuration, when the first protrusions 110 are about to enter the first trench 510, the first protrusions 110 smoothly enter the first trench 510 even if the first protrusions 110 are stuck in the first trench 510 because the first protrusions 110 rotate. Similarly, when the second protrusions 210 are about to enter the second trench 520, the second protrusions 210 smoothly enter the second trench 520 even if the second protrusions 210 are stuck in the second trench 520 because the second protrusions 210 rotate.

Moreover, as described with reference to FIGS. 5A and 5B, the maximum width of the portion of the first protrusion 110 to be inserted into the first trench 510 is substantially the same as the width of the first trench 510, and the maximum width of the portion of the second protrusion 210 to be inserted into the second trench 520 is substantially the same as the width of the second trench 520. In such a configuration, there is almost no clearance between the first protrusions 110 and the first trench 510, and between the second protrusions 210 and the second trench 520. As a result, it is possible to smoothly transport the holder 500 and to enhance the positioning accuracy for the holder 500 within the travel area, for example, the positioning accuracy for the holder 500 which is transported to the positions 421 to 424.

Figure 5C:
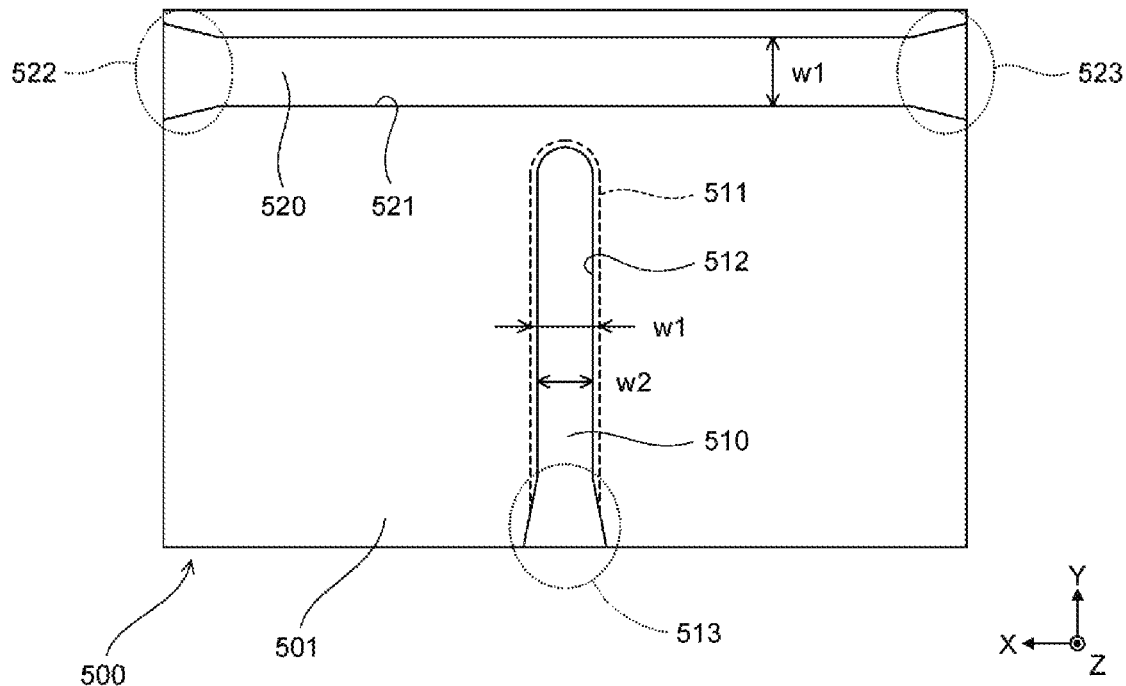
FIG. 5C is a schematic diagram illustrating a configuration where a lower surface of the holder according to Embodiment 1 is viewed in a negative Z-axis direction.

As illustrated in FIG. 5C, the end portion 522 on the positive X-axis side of the second trench 520 is opened in the positive X-axis direction. The opened end portion 522 is an end portion entered by the second protrusions 210 in the transport operation to transport the holder 500 in the positive X-axis direction. Since the end portion 522 is opened in the positive X-axis direction, it is possible to increase the transport distance of the holder 500 in the X-axis direction compared to the case where the end portion 522 is not opened in the positive X-axis direction.

Similarly, the end portion 523 on the negative X-axis side of the second trench 520 is opened in the negative X-axis direction. The opened end portion 523 is an end portion exited by the second protrusions 210 after entrance in the transport operation to transport the holder 500 in the positive X-axis direction. Since the end portion 523 is opened in the negative X-axis direction, it is possible to increase the transport distance of the holder 500 in the X-axis direction compared to the case where the end portion 523 is not opened in the negative X-axis direction.

The width of the end portion 522 increases toward the peripheral edge of the end portion 522, i.e., toward the positive X-axis direction. Similarly, the width of the end portion 523 increases toward the peripheral edge of the end portion 523, i.e., toward the negative X-axis direction. Thus, it is possible to smoothly insert and remove the second protrusions 210 into and from the second trench 520 even when there is a misalignment between the second protrusions 210 and the second trench 520.

Moreover, the end portion 513 on the negative Y-axis side of the first trench 510 is opened in the negative Y-axis direction. The opened end portion 513 is an end portion exited by the first protrusions 110 in the transport operation to transport the holder 500 in the positive Y-axis direction. Since the end portion 513 is opened in the negative Y-axis direction, it is possible to increase the transport distance of the holder 500 in the Y-axis direction compared to the case where the end portion 513 is not opened in the negative Y-axis direction.

The width of the end portion 513 increases toward the peripheral edge of the end portion 513, i.e., toward the negative Y-axis direction. Thus, it is possible to smoothly insert and remove the first protrusions 110 into and from the first trench 510 even when there is a misalignment between the first protrusions 110 and the first trench 510.

Figure 6A:
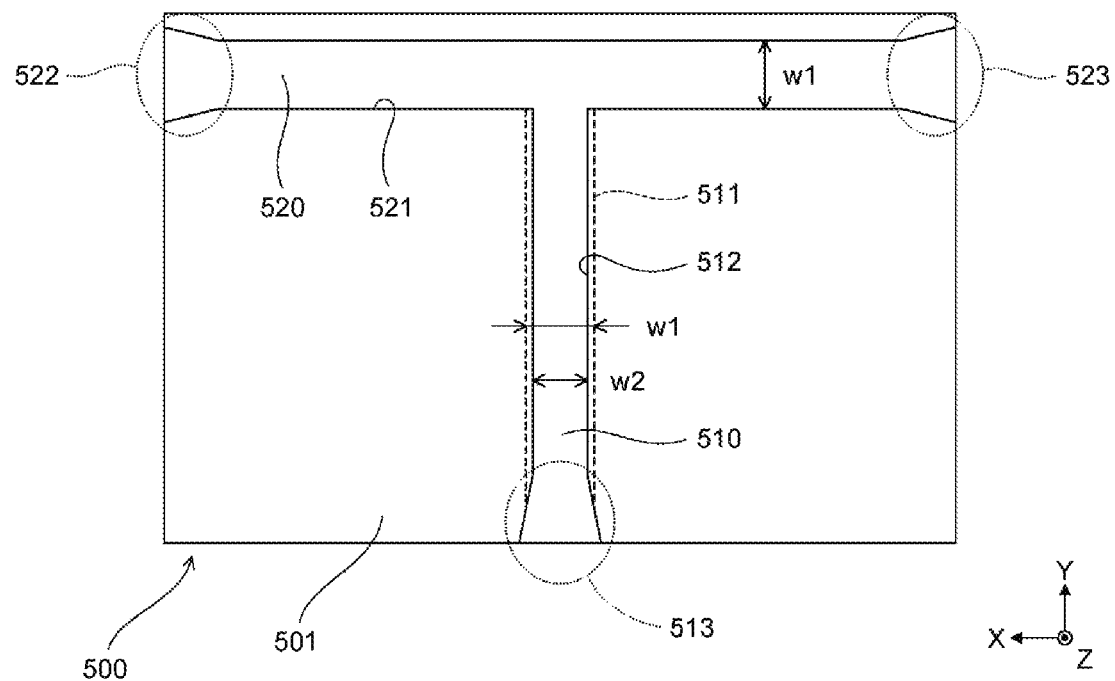
FIGS. 6A and 6B are schematic diagrams illustrating configurations where a lower surface of a holder according to a modified example of Embodiment 1 is viewed in the negative Z-axis direction.
Figure 6B:
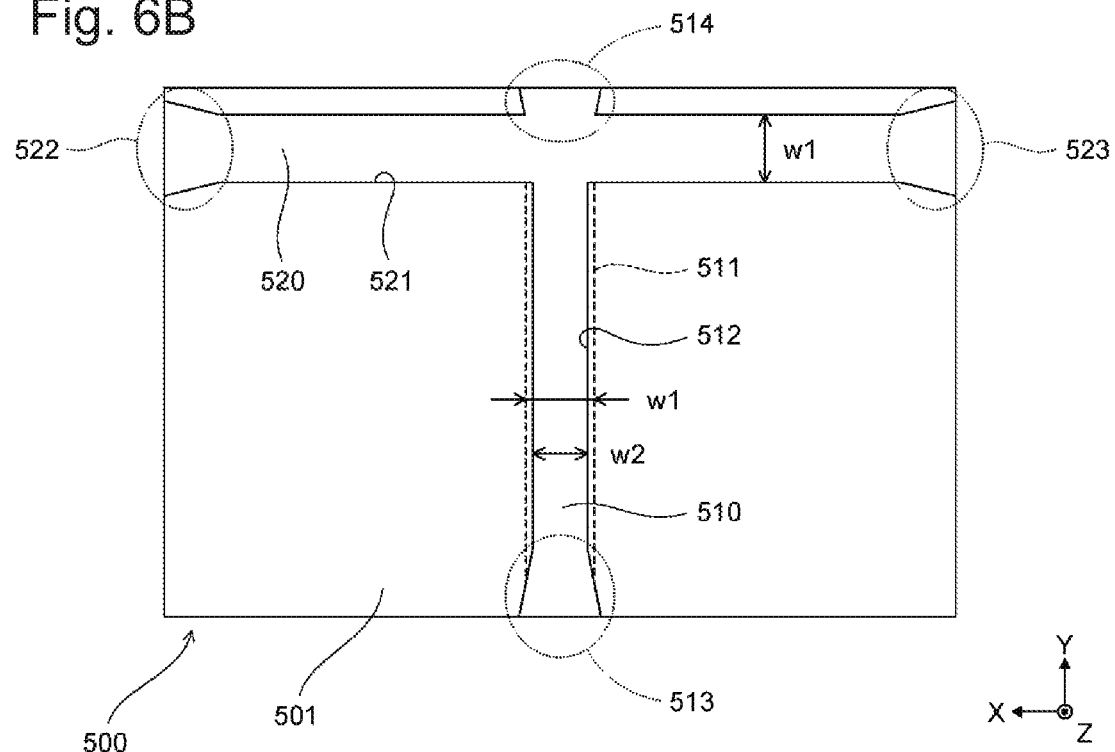

As illustrated in FIG. 6A, the first trench 510 may meet the second trench 520. Further, as illustrated in FIG. 6B, the first trench 510 may cross the second trench 520 and may be opened on the positive Y-axis direction side. In the configuration of FIG. 6B, it is possible to push the holder 500 positioned at the positions 421 and 424 to the negative Y-axis side using a separately provided mechanism, for example. In this case, the first protrusions 110 exit the end portion 514 on the positive Y-axis side of the first trench 510, which makes it possible to push the holder 500 at the positions 421 and 424 to the negative Y-axis side.

Figure 7A:
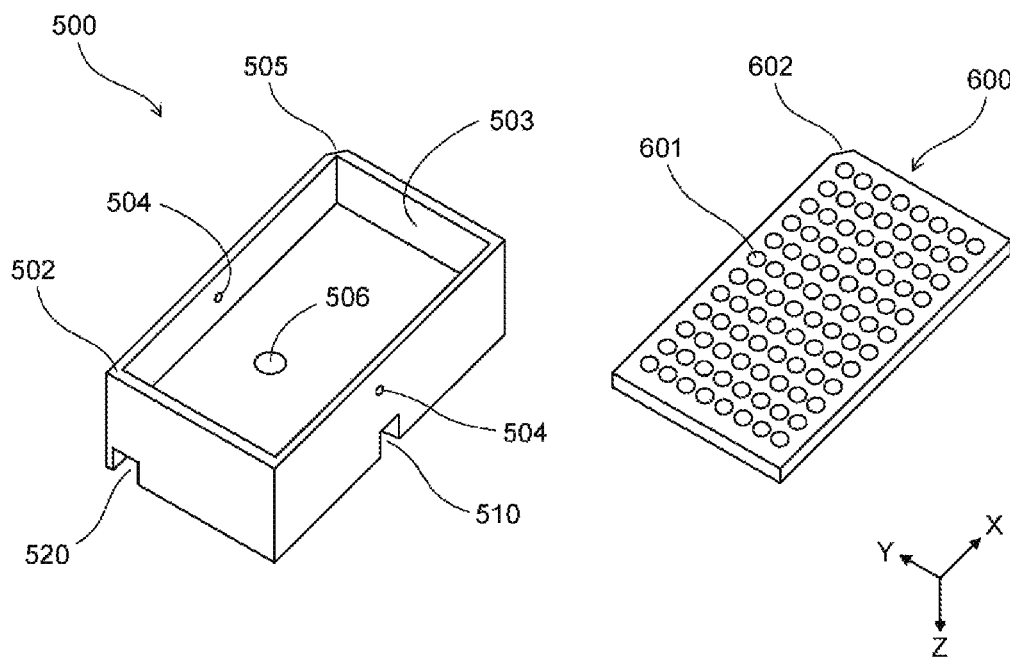
FIG. 7A is a schematic diagram illustrating a configuration where the holder and the plate according to Embodiment 1 are viewed from above.

As illustrated in FIG. 7A, a hollow portion 503 is provided in the upper surface 502 of the holder 500. Holes 504 are provided in the lateral surfaces on the positive Y-axis side and on the negative Y-axis side of the hollow portion 503, respectively. The hole 504 on the positive Y-axis side and the hole 504 on the negative Y-axis side are at the same position when viewed in the Y-axis direction. A chamfer 505 is provided at the position on the positive X-axis side and the positive Y-axis side of the upper surface 502. The plate 600 has a shape which fits into the outer peripheral shape of the upper surface 502. A chamfer 602 is provided at the position on the positive X-axis side and the positive Y-axis side of the plate 600. The plate 600 is set on the holder 500 such that the chamfer 602 of the plate 600 is located at the chamfer 505 of the holder 500 to set the plate 600 on the upper surface 502 of the holder 500.

Note that a hole 506 to set a specimen container for storing a specimen is provided in the bottom surface of the hollow portion 503. Thus, it is possible to set the specimen container for storing a specimen in the holder 500 instead of setting the plate 600 in the holder 500. In this case, the holder 500 transports the specimen in the specimen container set in the hole 506 in the XY-plane in the same manner as the plate 600.

Figure 7B:
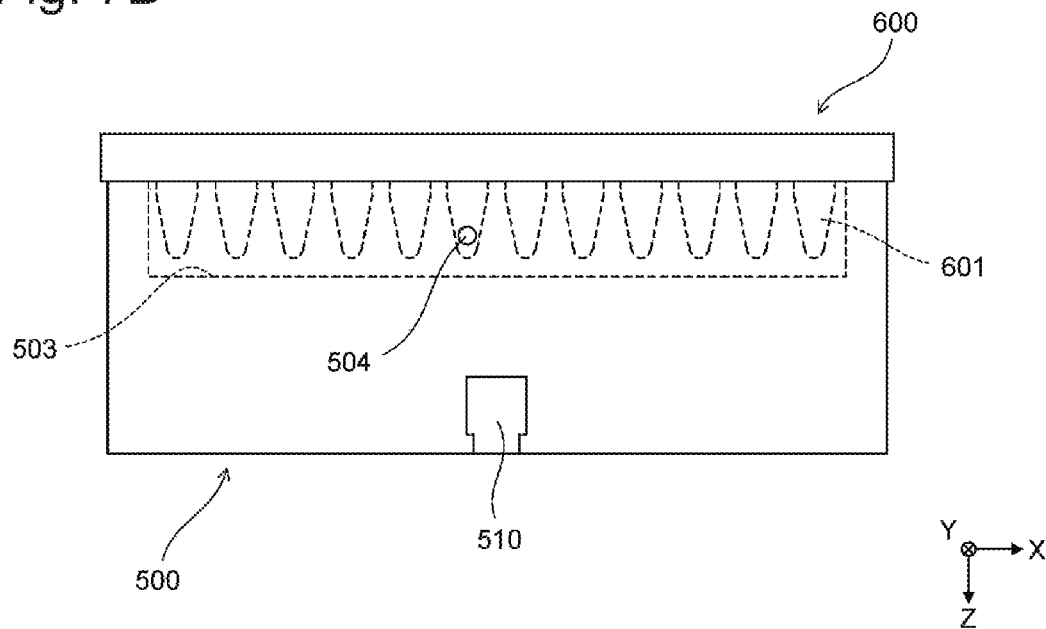
FIG. 7B is a schematic diagram illustrating a configuration where the holder on which the plate according to Embodiment 1 is set is viewed in the positive Y-axis direction.

As illustrated in FIG. 7B, when the plate 600 is set on the holder 500, 96 wells 601 are stored in the hollow portion 503. Here, the wells 601 are positioned between the pair of holes 504. Thus, the pair of sensors 454 are in the shutting state if the plate 600 is set on the holder 500 positioned at the position 421, and the pair of sensors 454 are in the transmitting state if the plate 600 is not set on the holder 500 positioned at the position 421. This means that the pair of sensors 454 can detect whether or not the plate 600 is not set on the holder 500 positioned at the position 421. Similarly, the pair of sensors 455 can detect whether or not the plate 600 is not set on the holder 500 positioned at the position 422.

If the plate 600 is set on the holder 500 in the incorrect direction, i.e., if the chamfer 602 of the plate 600 is not located at the chamfer 505 of the holder 500, the position of the plate 600 shifts in the negative Z-axis direction compared to that of FIG. 7B. Thus, the sensor 451 is in the transmitting state if the plate 600 is properly set on the holder 500 at the position 421, and the sensor 451 is in the shutting state if the plate 600 is not properly set on the holder 500 at the position 421. This means that the pair of sensors 451 can detect whether or not the plate 600 is properly set on the holder 500 at the position 421. Similarly, the pair of sensors 452 can detect whether or not the plate 600 is properly set on the holder 500 at the position 422.

As described above, the position in the Z-axis direction of the holder 500 is constantly maintained at the proper position because the configuration of the first trench 510 and the first protrusions 110 prevents the detachment of the holder 500 within the travel area in the X-axis direction. Thus, it is possible to eliminate the possibility that the holder 500 is slanted and set on the support surface 401 when the sensors 451 and 452 are in the shutting state. As a result, it is possible to surely detect whether or not the plate 600 is properly set on the holder 500 at the positions 421 and 422.

Figure 8A:
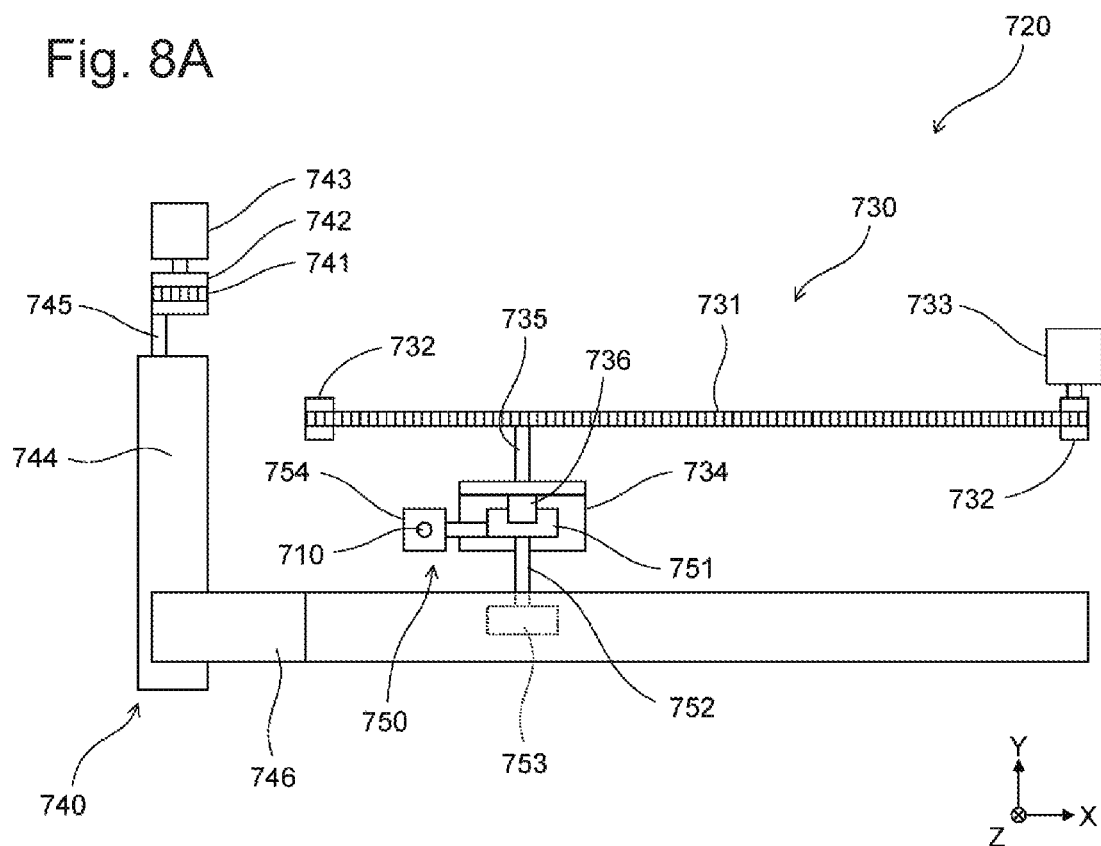
FIG. 8A is a schematic diagram illustrating a configuration where a transfer unit according to Embodiment 1 is viewed in a positive Z-axis direction.

As illustrated in FIG. 8A, the transfer unit 720 includes transfer mechanisms 730 and 740, and a support unit 750.

The transfer mechanism 730 includes a belt 731, two pulleys 732, a motor 733, a support member 734, a fastener 735, and a rail 736. The belt 731 is wound around the two pulleys 732. The two pulleys 732 are arranged adjacent to each other in the X-axis direction at a predetermined interval. The pulley 732 on the positive X-axis side is connected to a drive shaft of the motor 733. The motor 733 is a stepper motor. The support member 734 is configured such that it can travel in the X-axis direction while being supported by a not-illustrated rail. The support member 734 is connected to the belt 731 with the fastener 735. The rail 736 extends in the Z-axis direction and is set on the support member 734.

The transfer mechanism 740 includes a belt 741, two pulleys 742, a motor 743, a support member 744, a fastener 745, and a guide member 746. The belt 741 is wound around the two pulleys 742. The two pulleys 742 are arranged adjacent to each other in the Z-axis direction at a predetermined interval. In FIG. 8A, only the pulley 742 on the negative Z-axis side is illustrated for convenience. The pulley 742 on the negative Z-axis side is connected to a drive shaft of the motor 743. The motor 743 is a stepper motor. The support member 744 is configured such that it can travel in the Z-axis direction while being supported by a not-illustrated rail. The support member 744 is connected to the belt 741 with the fastener 745. The guide member 746 extends in the X-axis direction and is set on the support member 744.

The support unit 750 includes a slide member 751, a support shaft 752, a roller 753, and a hold member 754. The slide member 751 is configured such that it can travel in the Z-axis direction while being supported by the rail 736. The support shaft 752 extends in the Y-axis direction, and the end portion on the positive Y-axis side of the support shaft 752 is set on the slide member 751. The roller 753 is set on the end portion on the negative Y-axis side of the support shaft 752 so that it can rotate about the support shaft 752. The hold member 754 is set on the slide member 751 and holds the aspiration tube 710.

Figure 8B:
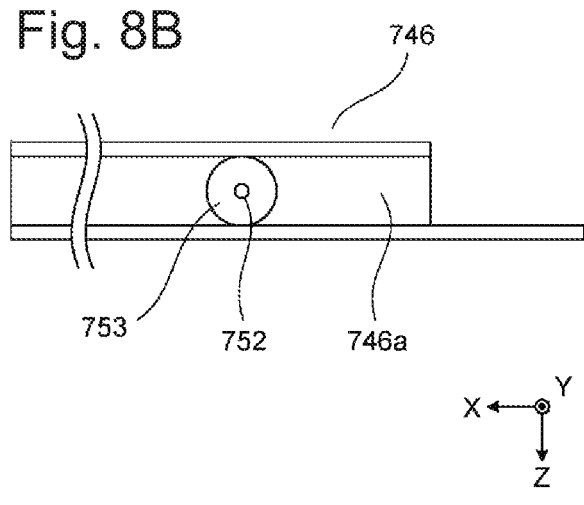
FIG. 8B is a schematic diagram illustrating a configuration where a guide member, a roller, and a support shaft according to Embodiment 1 are viewed in a negative Y-axis direction.
Figure 8C:
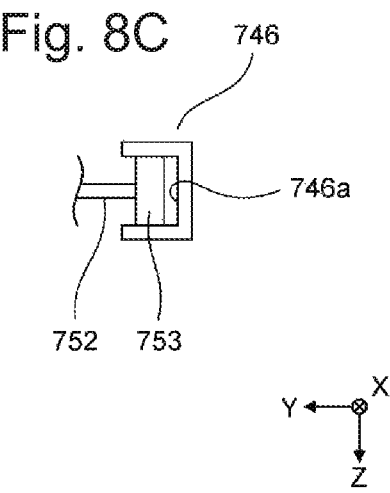
FIG. 8C is a schematic diagram illustrating a configuration where the guide member, the roller, and the support shaft according to Embodiment 1 are viewed in the positive X-axis direction.

As illustrated in FIGS. 8B and 8C, the guide member 746 includes a trench 746a which extends in the X-axis direction. The roller 753 is stored in the trench 746a such that it can travel in the X-axis direction.

The motor 743 is driven when the transfer unit 720 causes the aspiration tube 710 to travel in the Z-axis direction. Thus, the belt 741 travels, and the support member 744 and the guide member 746 travel in the Z-axis direction in conjunction with the movement of the belt 741. When the guide member 746 travels in the Z-axis direction, the roller 753 sandwiched by the trench 746a receives a force in the Z-axis direction. When the roller 753 receives a force in the Z-axis direction, the slide member 751 and the hold member 754 travel in the Z-axis direction via the support shaft 752. In such a manner, the aspiration tube 710 travels in the Z-axis direction.

The motor 733 is driven when the transfer unit 720 causes the aspiration tube 710 to travel in the X-axis direction. Thus, the belt 731 travels, and the support member 734 travels in the X-axis direction in conjunction with the movement of the belt 731. When the support member 734 travels in the X-axis direction, the slide member 751 receives a force in the X-axis direction via the rail 736. Here, the roller 753 travels in the X-axis direction while being guided in the trench 746a. When the slide member 751 receives a force in the X-axis direction, the hold member 754 travels in the X-axis direction. In such a manner, the aspiration tube 710 travels in the X-axis direction.

As described above, the aspiration tube 710 is caused to travel in the X-axis direction and the Z-axis direction, but is not caused to travel in the Y-axis direction. In addition, the holder 500 is transported in the Y-axis direction near the position 423, as described above. Hence, according to Embodiment 1, it is possible to aspirate specimens from all of the wells 601 of the plate 600 set on the holder 500 using the aspiration tube 710 even without a mechanism to cause the aspiration tube 710 to travel in the Y-axis direction. Moreover, the transfer unit 720 does not have to include a mechanism to cause the aspiration tube 710 to travel in the Y-axis direction. Hence, the configuration of the transfer unit 720 is simplified.

Figure 9:
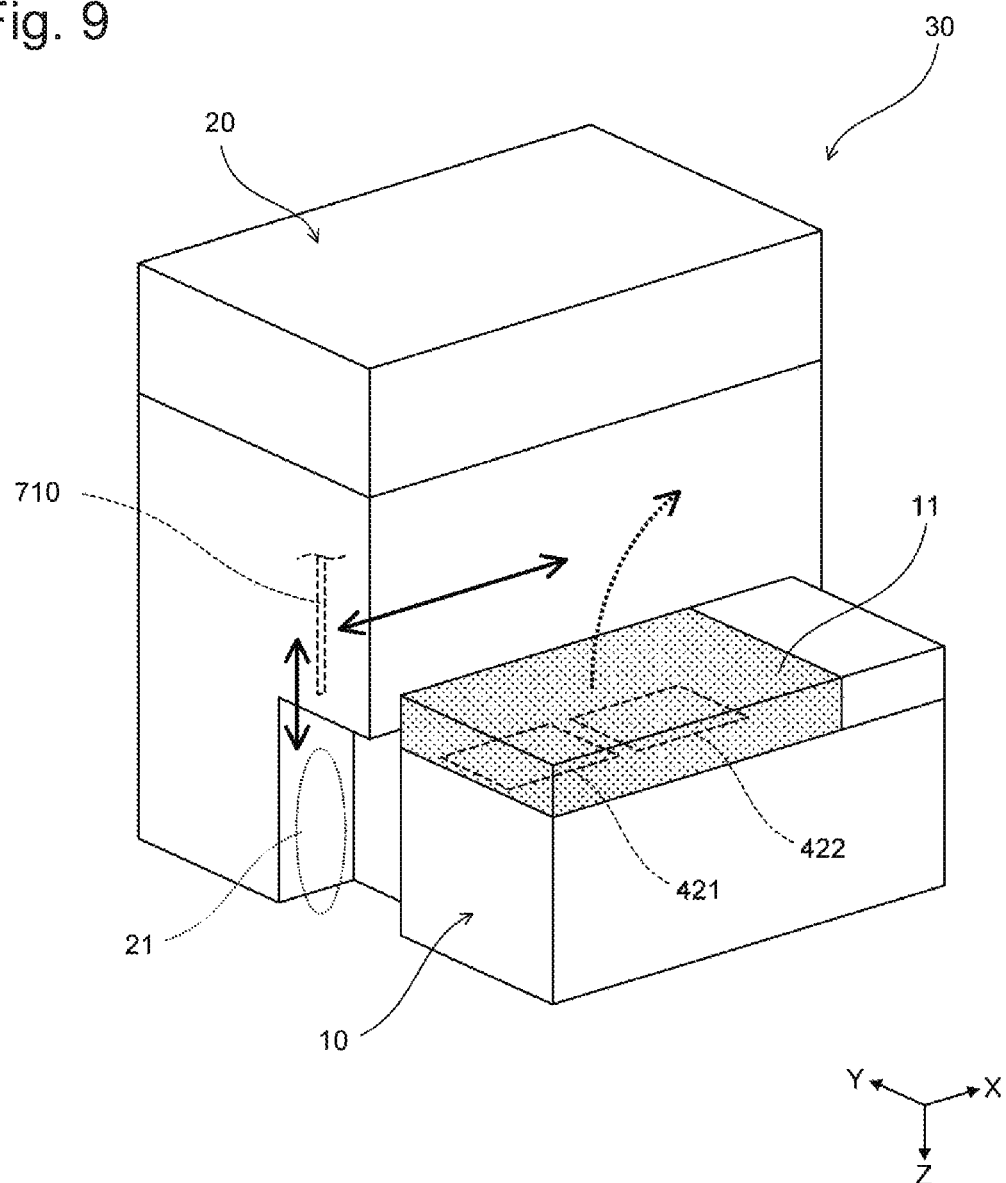
FIG. 9 is a schematic diagram illustrating a configuration of an external appearance of a specimen measurement apparatus according to Embodiment 1.

As illustrated in FIG. 9, a specimen measurement apparatus 30 includes a specimen transport apparatus 10 and a treatment apparatus 20. The aspiration tube 710 and the transfer unit 720 are arranged in the treatment apparatus 20.

The specimen measurement apparatus 30 is an apparatus which measures a specimen prepared based on the BEAMing (bead, emulsion, amplification, and magnetics) method. The specimens to be stored in the wells 601 of the plate 600 are prepared in advance by the preprocess based on the BEAMing method. The preprocess based on the BEAMing method is, for example, a DNA extraction process, a dilution process, an emulsion preparation process, a PCR process, a demulsification process, a hybridization process, and a cleaning process. The specimen measurement apparatus 30 measures specimens prepared by the preprocess by use of a flow cytometer.

Note that the specimen measurement apparatus 30 may be an apparatus which performs part of or all of the preprocess based on the BEAMing method in addition to the measurement process by use of the flow cytometer, or may be an apparatus which performs part of or all of the preprocess based on the BEAMing method instead of the measurement process by use of the flow cytometer. Moreover, the specimen measurement apparatus 30 may be an apparatus which performs not only a process based on the BEAMing method, but also measurement or process of specimens.

In the measurement of the specimen, the operator stores the specimen in the wells 601 of the two plates 600. The operator opens the cover part 11 of the specimen transport apparatus 10 as indicated with the dotted arrow. The cover part 11 is provided at a position to open an upper portion of the holder 500 positioned at the positions 421 and 422. The two holders 500 are positioned at the positions 421 and 422 as the initial positions. The operator sets two plates 600 storing the specimen on the two holders 500 positioned at the positions 421 and 422 and then closes the cover part 11.

Subsequently, the operator operates an input unit 35 to be described later to cause the specimen measurement apparatus 30 to start measurement of the specimen. Then, the holder 500 is transported and the specimen in the wells 601 is aspirated by the aspiration tube 710. After that, the specimen measurement apparatus 30 measures the specimen with a measurement unit 33 to be described later, and displays a measurement result on a display unit 34 to be described later.

Note that the operator may set the specimen container storing a specimen on the holder 500 instead of the plate 600, as described above. In addition, the operator may measure the specimen in the specimen container after positioning the specimen container storing the specimen at the external position 21 of the specimen measurement apparatus 30. In this case, as illustrated in FIG. 9, the aspiration tube 710 travels to above the position 21 and the specimen is aspirated from the specimen container positioned at the position 21.

Figure 10:
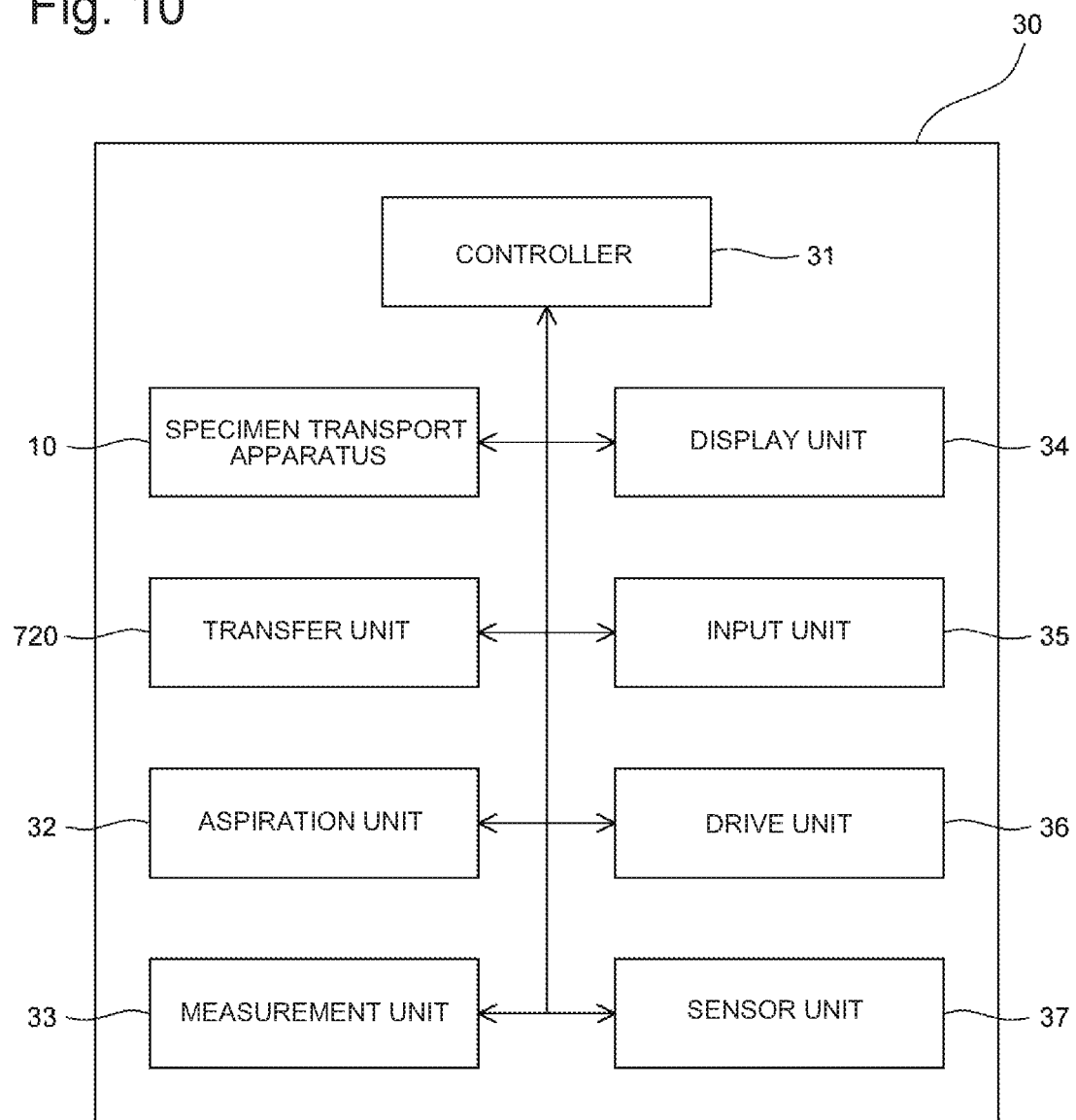
FIG. 10 is a block diagram illustrating a configuration of the specimen measurement apparatus according to Embodiment 1.

As illustrated in FIG. 10, the specimen measurement apparatus 30 includes the specimen transport apparatus 10, the transfer unit 720, a controller 31, an aspiration unit 32, the measurement unit 33, the display unit 34, the input unit 35, a drive unit 36, and a sensor unit 37. The transfer unit 720, the controller 31, the aspiration unit 32, the measurement unit 33, the display unit 34, the input unit 35, the drive unit 36, and the sensor unit 37 are arranged in the treatment apparatus 20 illustrated in FIG. 9. If a separate information processing apparatus is connected to the treatment apparatus 20, the controller 31, the display unit 34, and the input unit 35 may be arranged in the information processing apparatus.

The controller 31 includes an arithmetic processing unit a memory unit, for example. The arithmetic processing unit is a CPU or an MPU, for example. The memory unit is a flash memory or a hard disk, for example. The controller 31 receives signals from the units of the specimen measurement apparatus 30 and controls the units of the specimen measurement apparatus 30. The aspiration unit 32 includes the aspiration tube 710 and a pressure applying unit to aspirate the specimen. The aspiration unit 32 applies a negative pressure to the aspiration tube 710 using the pressure applying unit to aspirate the specimen transported by the holder 500 using the aspiration tube 710. The measurement unit 33 includes the flow cytometer and measures the specimen aspirated by the aspiration unit 32 by use of the flow cytometer.

The display unit 34 and the input unit 35 are arranged on the lateral surface portion or the upper surface portion of the treatment apparatus 20, for example. The display unit 34 includes a liquid crystal panel, for example. The input unit 35 includes a button or a touch panel, for example. The drive unit 36 includes another mechanism provided in the specimen measurement apparatus 30. The sensor unit 37 includes another sensor provided in the specimen measurement apparatus 30.

Next, the transport of the holder 500 is described with reference to FIG. 11A to FIG. 14.

Figure 11A:
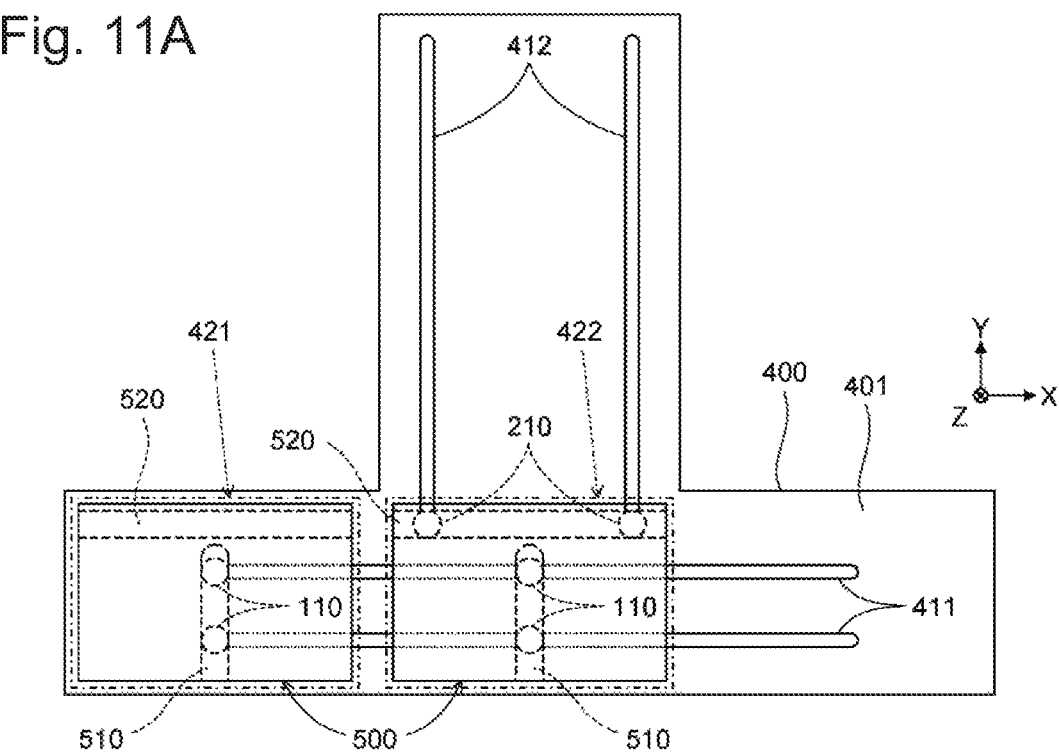
FIGS. 11A and 11B are schematic diagrams for explaining the transport of the holder according to Embodiment 1.
Figure 11B:
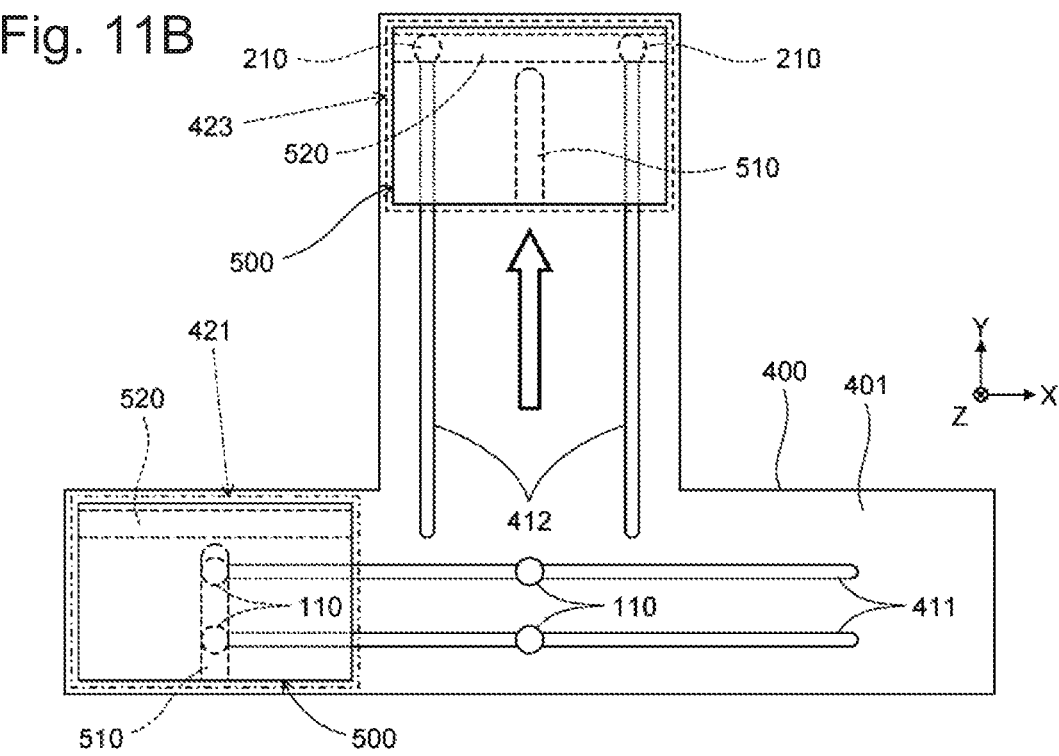

As illustrated in FIG. 11A, the two holders 500 are positioned at the positions 421 and 422 as the initial positions. Here, the plate 600 is set on each of the two holders 500, as described above. When an instruction to start measurement is inputted, the second protrusions 210 travel in the positive Y-axis direction from the state of FIG. 11A, and the holder 500 at the position 422 is positioned at the position 423, as illustrated in FIG. 11B. Here, when the holder 500 is transported from the position 422 to the position 423, the aspiration tube 710 is transferred in the X-axis direction, and the specimens are aspirated in sequence from all of the wells 601 on the holder 500.

Figure 12A:
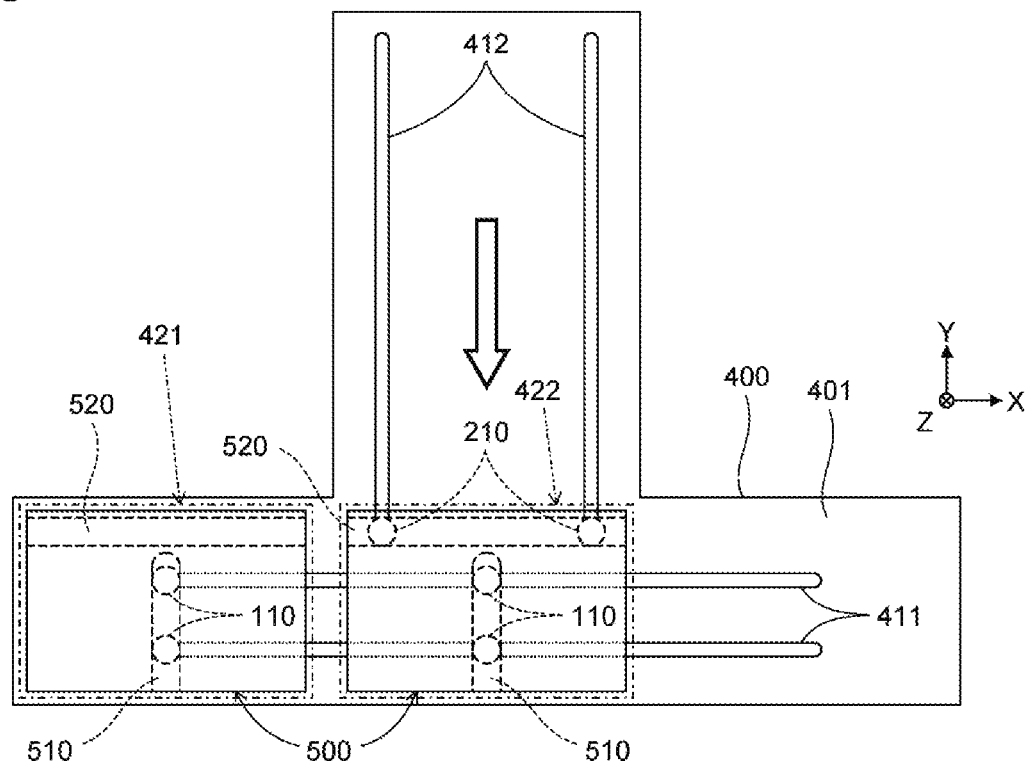
FIGS. 12A and 12B are schematic diagrams for explaining the transport of the holder according to Embodiment 1.
Figure 12B:
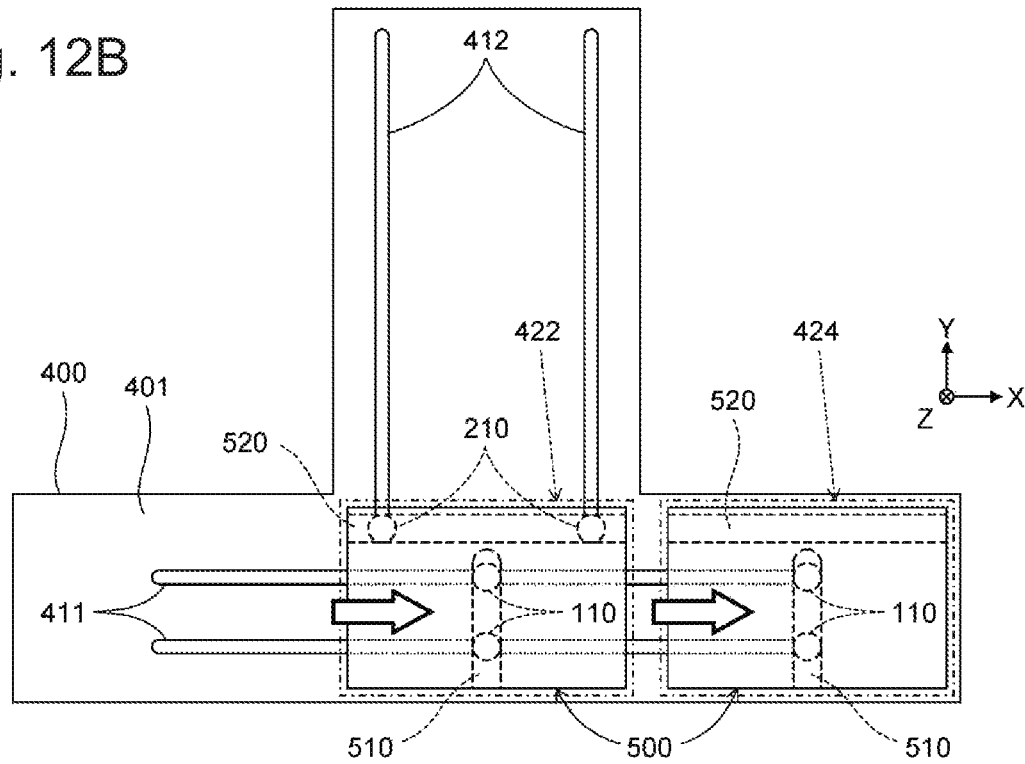

Subsequently, the second protrusions 210 travel in the negative Y-axis direction from the state of FIG. 11B, and the holder 500 at the position 423 is returned to the position 422, as illustrated in FIG. 12A. Subsequently, the first protrusions 110 travel in the positive X-axis direction from the state illustrated in FIG. 12A, and as illustrated in FIG. 12B, the holders 500 at the positions 421 and 422 are positioned at the positions 422 and 424, respectively. Note that as described with reference to FIG. 4, the pair of first protrusions 110 on the positive X-axis side and the pair of first protrusions 110 on the negative X-axis side are sent in the positive X-axis direction at the same time by the first travel unit 100. For this reason, the holder 500 on the positive X-axis side and the holder 500 on the negative X-axis side are transferred in the positive X-axis direction at the same time.

Figure 13A:
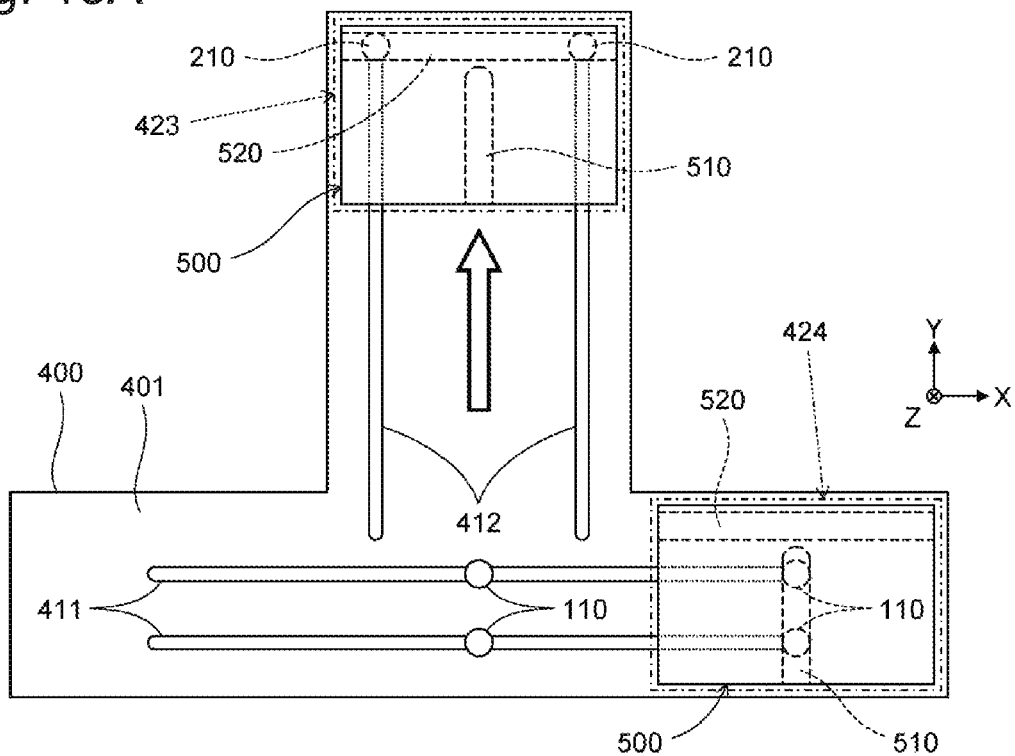
FIGS. 13A and 13B are schematic diagrams for explaining the transport of the holder according to Embodiment 1.
Figure 13B:
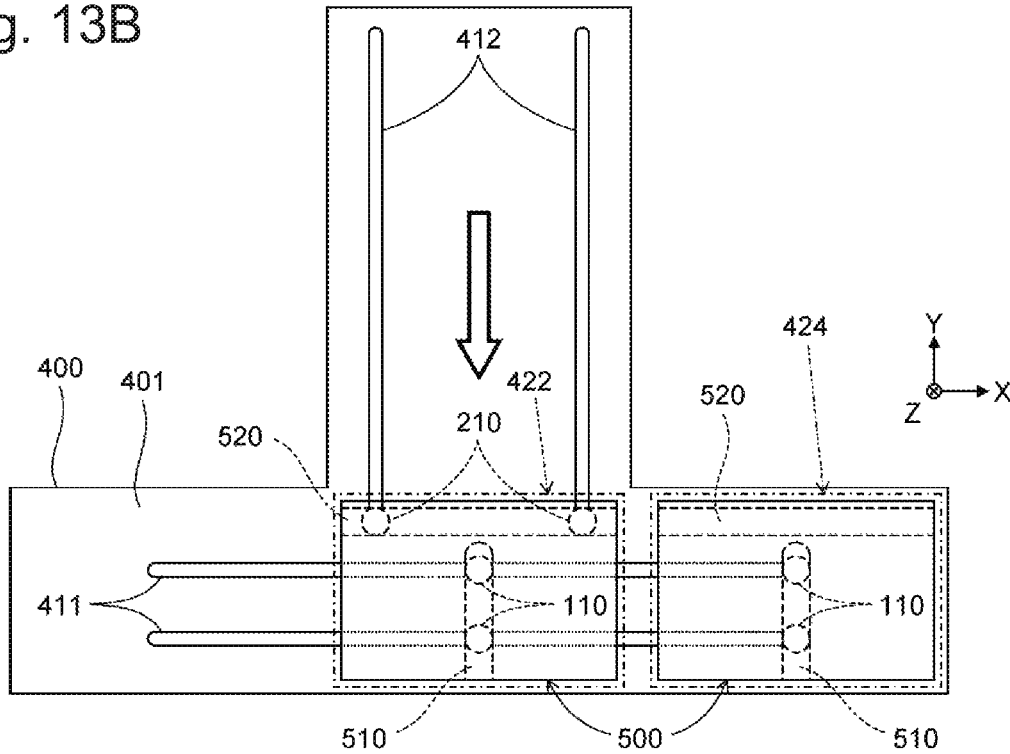
Figure 14:
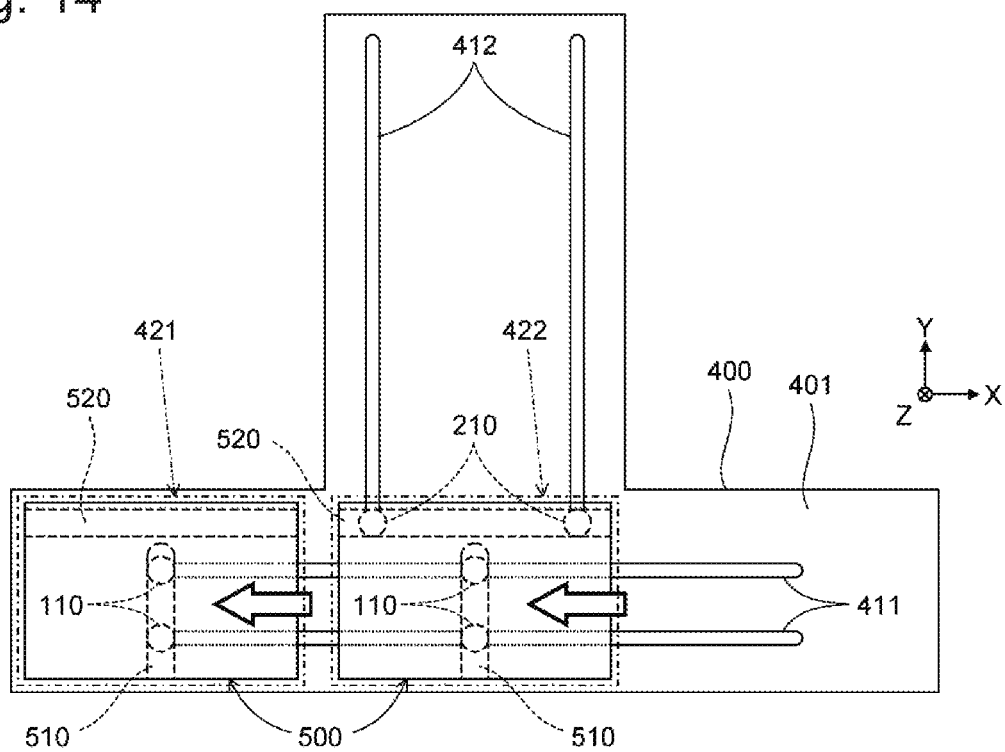
FIG. 14 is a schematic diagram for explaining the transport of the holder according to Embodiment 1.

Subsequently, the second protrusions 210 travel in the positive Y-axis direction from the state illustrated in FIG. 12B, and the holder 500 at the position 422 is positioned at the position 423, as illustrated in FIG. 13A. Also in this case, when the holder 500 is transported from the position 422 to the position 423, the aspiration tube 710 is transferred in the X-axis direction, and the specimens are aspirated in sequence from all of the wells 601 on the holder 500. Subsequently, the second protrusions 210 travel in the negative Y-axis direction from the state illustrated in FIG. 13A, and the holder 500 at the position 423 is returned to the position 422, as illustrated in FIG. 13B. Subsequently, the first protrusions 110 travel in the negative X-axis direction from the state illustrated in FIG. 13B, and as illustrated in FIG. 14, the holders 500 at the positions 422 and 424 are positioned at the positions 421 and 422, respectively.

As described above, aspiration for all of the wells 601 on the two holders 500 is completed. The operator opens the cover parts 11 and recovers the plates 600 set on the holders 500 positioned at the positions 421 and 422.

Note that if the plate 600 is disposed on only one of the two holders 500 positioned at the position 421 and the position 422, the transport operation is performed only for the holder 500 on which the plate 600 is disposed. If the plate 600 is disposed only on the holder 500 positioned at the position 421, the above-described transport operation on the holder 500 positioned at the position 422 is skipped. Additionally, if the plate 600 is disposed only on the holder 500 positioned at the position 422, the above-described transport operation on the holder 500 positioned at the position 421 is skipped.

Figure 15:
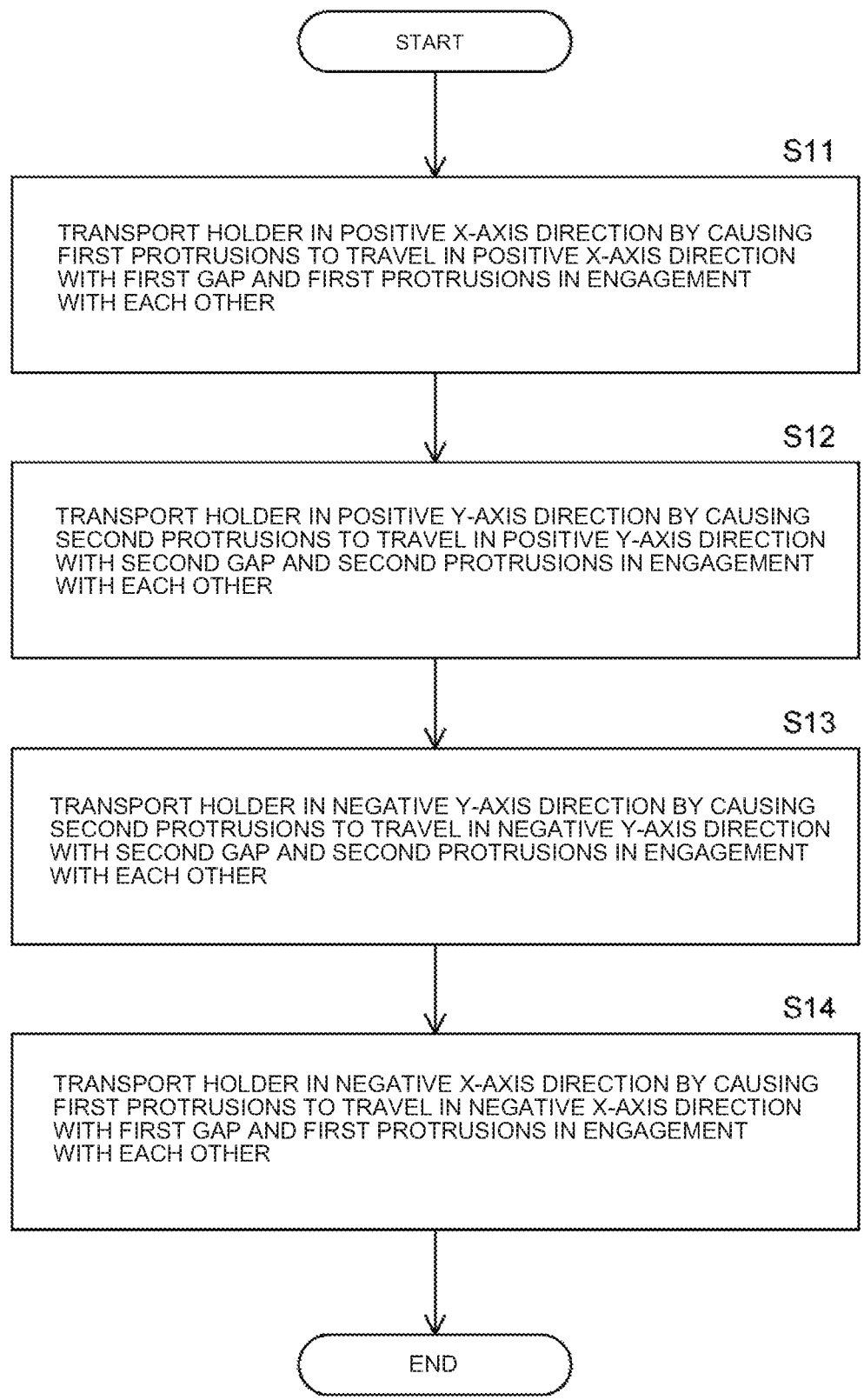
FIG. 15 is a flowchart illustrating a transport operation of the holder according to Embodiment 1.

Next, the transport operation of the holder 500 is described with reference to FIG. 15. The flowchart illustrated in FIG. 15 indicates the transport operation related to the holder 500 on the negative X-axis side among the two holders 500.

At step S11, the controller 31 drives the first transporter 310 with the first trench 510 and the first protrusions 110 in engagement with each other, causes the first protrusions 110 to travel in the positive X-axis direction, and transports the holder 500 in the positive X-axis direction. As a result, the holder 500 positioned at the position 421 as the initial position as illustrated in FIG. 12A is transported to the position 422 as illustrated in FIG. 12B. At step S11, when the holder 500 is transported in the positive X-axis direction, the second protrusions 210 are inserted into the second trench 520.

At step S12, the controller 31 drives the second transporter 320 with the second trench 520 and the second protrusions 210 in engagement with each other, causes the second protrusions 210 to travel in the positive Y-axis direction, and transports the holder 500 in the positive Y-axis direction. As a result, the holder 500 positioned at the position 422 as illustrated in FIG. 12B is transported to the position 423 as illustrated in FIG. 13A. At step S12, when the holder 500 is transported in the positive Y-axis direction, the first protrusions 110 inserted in the first trench 510 are pulled out of the first trench 510.

At step S13, the controller 31 drives the second transporter 320 with the second trench 520 and the second protrusions 210 in engagement with each other, causes the second protrusions 210 to travel in the negative Y-axis direction, and transports the holder 500 in the negative Y-axis direction. As a result, the holder 500 positioned at the position 423 as illustrated in FIG. 13A is transported to the position 422 as illustrated in FIG. 13B. At step S13, when the holder 500 is transported in the negative Y-axis direction, the first protrusions 110 are inserted into the first trench 510.

At step S14, the controller 31 drives the first transporter 310 with the first trench 510 and the first protrusions 110 in engagement with each other, causes the first protrusions 110 to travel in the negative X-axis direction, and transports the holder 500 in the negative X-axis direction. As a result, the holder 500 positioned at the position 422 as illustrated in FIG. 13B is transported to the position 421 as illustrated in FIG. 14. At step S14, when the holder 500 is transported in the negative X-axis direction, the second protrusions 210 inserted in the second trench 520 are pulled out of the second trench 520. In such a manner, the transport operation of the holder 500 on the negative X-axis side is completed.

Note that the transport operation of the holder 500 on the positive X-axis side is performed in the same manner. In the transport operation of the holder 500 on the positive X-axis side, the process of step S11 is rearranged between the process of step S13 and the process of step S14.

If the holder 500 is transported along the XY-plane as in the foregoing description, it is possible to transport the holder 500 to a treatment apparatus positioned at each of the positions 421, 423, and 424, for example. This makes it possible to pass the specimens between the apparatuses set at the positions 421, 423, and 424. For example, if an apparatus is provided near the position 421 which performs a preprocess based on the BEAMing method, it is possible to dispense a specimen prepared through the preprocess by this apparatus into the wells 601 of the plate 600 on the holder 500 positioned at the position 421. Such a configuration makes it possible to smoothly perform the preprocess and measurement based on the BEAMing method because the holder 500 can transport the specimen prepared by the apparatus for the preprocess to the position 423, and the specimen can be aspirated with the aspiration tube 710.

In the case of removing the plate 600 and then setting the specimen container storing the specimen directly on the holder 500, an identification sign may further be attached on each of the holders 500, positions 421 and 422, etc. which indicates the processing order for the holders 500 or the types and the like of the specimens to be set in the holders 500.

Figure 16A:
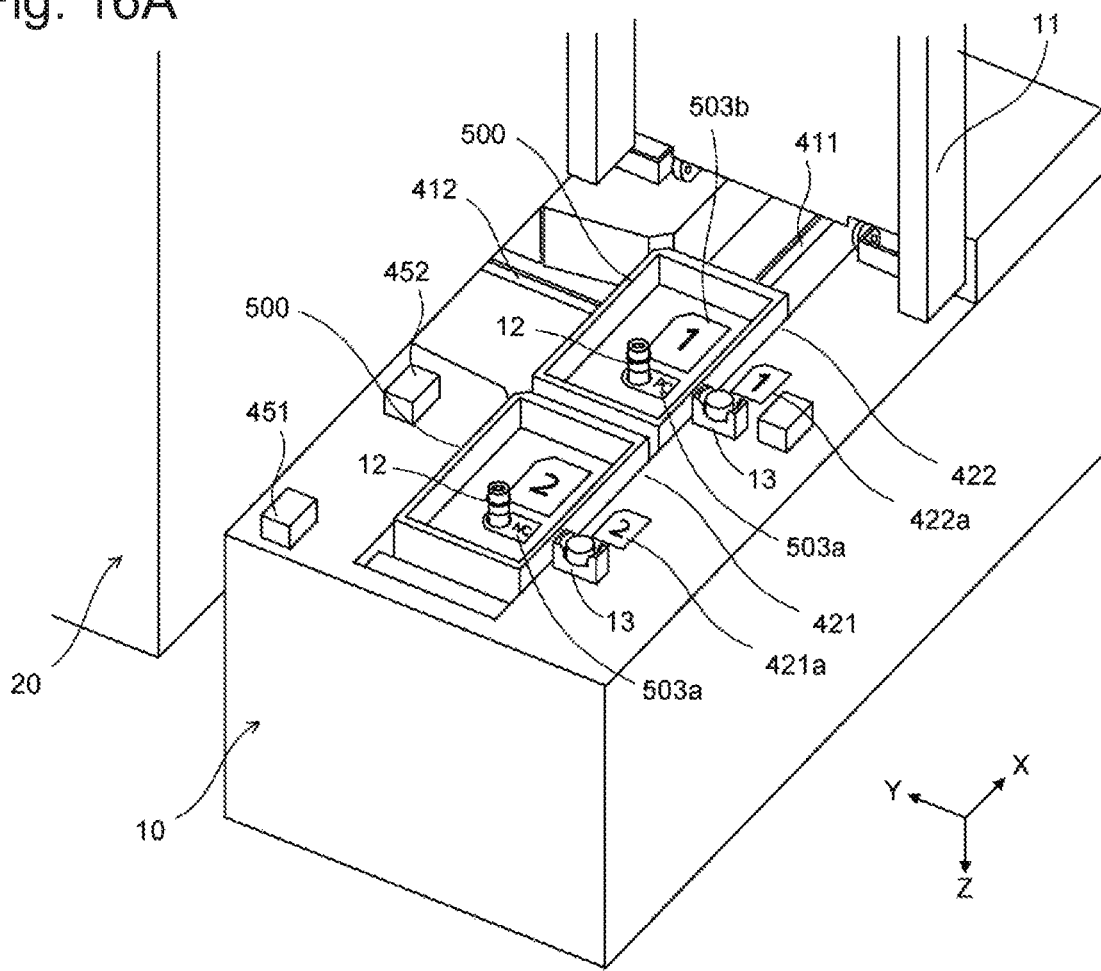
FIG. 16A is a perspective view illustrating a configuration of the specimen transport apparatus according to the modified example of Embodiment 1 with a cover part open.
Figure 16B:
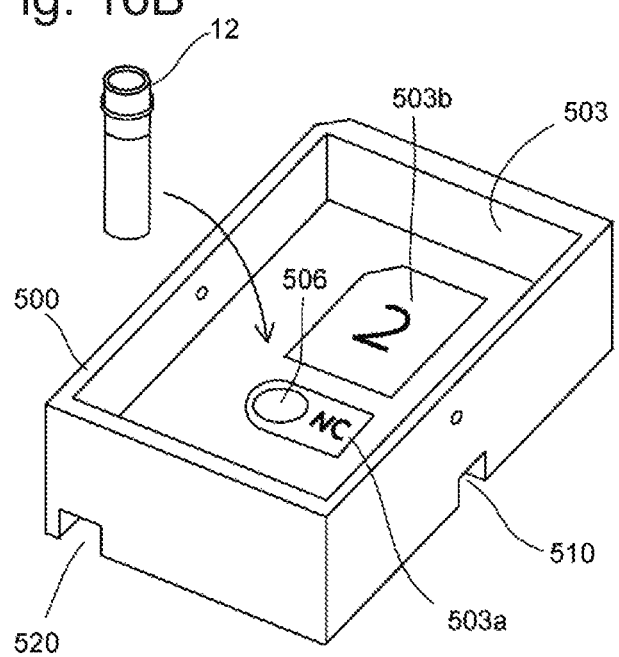
FIG. 16B is a perspective view illustrating a configuration of the holder according to the modified example of Embodiment 1.

For example, if the operator performs accuracy management of the specimen measurement apparatus 30, the operator sets specimen containers storing control substances on the holders 500, operates the input unit 35, and causes the specimen measurement apparatus 30 to start the measurement of the control substances. In this case, as illustrated in FIGS. 16A and 16B, an identification sign 503a which indicates the type of the control substance to be set in the hole 506 may be attached on the bottom surface of the hollow portion 503 of each holder 500, and an identification sign 503b may be attached on each holder 500 which indicates the processing order of the holders 500. FIG. 16B illustrates the holder 500 on the negative X-axis side of FIG. 16A.

Attached on the holder 500 on the negative X-axis side are: the identification sign 503a with the letters "NC" which indicate that the specimen container 12 for accuracy management to be set in the hole 506 is a reagent container storing a negative control substance; and the identification sign 503b with the character "2" which indicates that the processing order is the second. On the other hand, attached on the holder 500 on the positive X-axis side are: the identification sign 503a with the letters "PC" which indicate that the specimen container 12 for accuracy management to be set in the hole 506 is a reagent container storing a positive control substance; and the identification sign 503b with the character "1" which indicates that the processing order is the first. Furthermore, in the configuration example of FIG. 16A, identification signs 421a and 422a which indicate the processing order of the holders 500 are attached at the positions on the negative Y-axis side of the positions 421 and 422, respectively, on the housing upper surface of the specimen transport apparatus 10.

These identification signs make it possible for the operator to know the correct holders 500 to hold the specimen container 12 storing the positive control substance and the specimen container 12 storing the negative control substance, and also to know the processing order of the specimen containers 12.

Based on the identification signs 503a of the holders 500, the operator sets the specimen container 12 storing the negative control substance on the holder 500 positioned at the position 421, and sets the specimen container 12 storing the positive control substance on the holder 500 positioned at the position 422. As described above, since it is possible to set the specimen containers 12 storing the accuracy management substances in the holes 506, the operator does not have to dispense the control substances stored in the specimen containers 12 into the wells 601 of the plate 600, and is allowed to easily perform the operation of the accuracy management.

Additionally, the configuration of FIGS. 16A and 16B makes it possible for the specimen measurement apparatus 30 to determine whether the control substance transported by the specimen transport apparatus 10 and provided for the accuracy management is the positive or negative control substance because the identification signs 503a designate in advance the specimen containers 12 storing the positive and negative control substances to be set in the holders 500. Hence, the specimen measurement apparatus 30 is allowed to smoothly execute the process for the accuracy management in accordance with a positive or negative accuracy management condition held in advance without the operator performing input operation to designate the control substance to be provided for the accuracy management.

Furthermore, in the configuration example of FIG. 16A, cap holders 13 are provided for setting caps 12a of the specimen containers 12 at the positions on the negative Y-axis side of the positions 421 and 422, respectively, on the housing upper surface of the specimen transport apparatus 10. The operator can set the caps 12a removed from the specimen containers 12 on the cap holders 13, and thus can properly manage the caps 12a removed from the specimen containers 12.

As illustrated in FIG. 16A, the two cap holders 13 are preferably provided at the positions near the holes 506 in the negative Y-axis direction when the holders 500 are at the initial positions illustrated in FIG. 16A. This makes it possible for the operator to smoothly attach and detach the caps 12a on and from the specimen containers 12 and to smoothly set and remove the caps 12a on and from the cap holders 13.

Figure 16C:
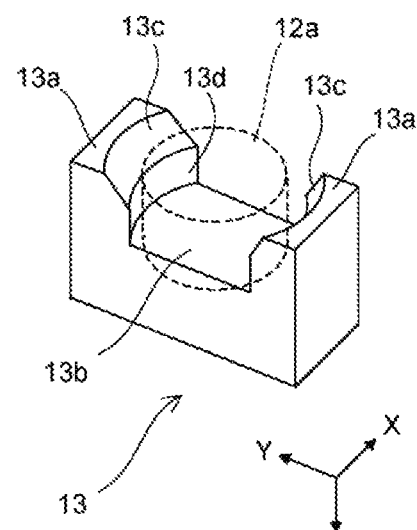
FIG. 16C is a perspective view illustrating a configuration of a cap holder according to the modified example of Embodiment 1.

As illustrated in FIG. 16C, the cap holder 13 includes a pair of protrusions 13a protruding in the negative Z-axis direction, and a surface 13b parallel to the horizontal plane (XY-plane). The cap 12a is mounted on the surface 13b. The pair of protrusions 13a restrict the movement of the cap 12a mounted on the surface 13b in the Y-axis direction. A slanting surface 13c and a wall surface 13d are formed continuously on the upper side and the lower side, respectively, of the inner lateral surface of each of the pair of protrusions 13a. The slanting surface 13c has the shape of an arc in a plan view, and the diameter decreases toward the negative Z-axis side. The wall surface 13d has the shape of an arc in a plan view. The wall surface 13d is configured such that when the cap 12a is mounted on the surface 13b, the entire region of the wall surface 13d faces the outer peripheral surface of the cap 12a with a slight gap. This reduces the risk that the cap 12a drops from the surface 13b in the X-axis direction. The cap holder 13 has a shape symmetrical with respect to the X-axis direction and the Y-axis direction.

The operator is allowed to smoothly mount the cap 12a removed from the specimen container 12 from above the cap holder 13 along the slanting surface 13c. In addition, the operator can easily pick the cap 12a mounted on the surface 13b in the X-axis direction because the portion of the cap holder 13 higher than the surface 13b is opened in the positive and negative X-axis directions.

Note that as illustrated in FIG. 16C, the cap holder 13 preferably configured such that the width in the X-axis direction of the pair of protrusions 13a is smaller than the diameter of the cap 12a. Such a configuration makes it possible for the operator to more smoothly pick the cap 12a mounted on the surface 13b because the portions on the positive and negative sides of the cap 12a jut out of the protrusions 13a when the cap 12a is mounted on the surface 13b.

Embodiment 2

Figure 17:
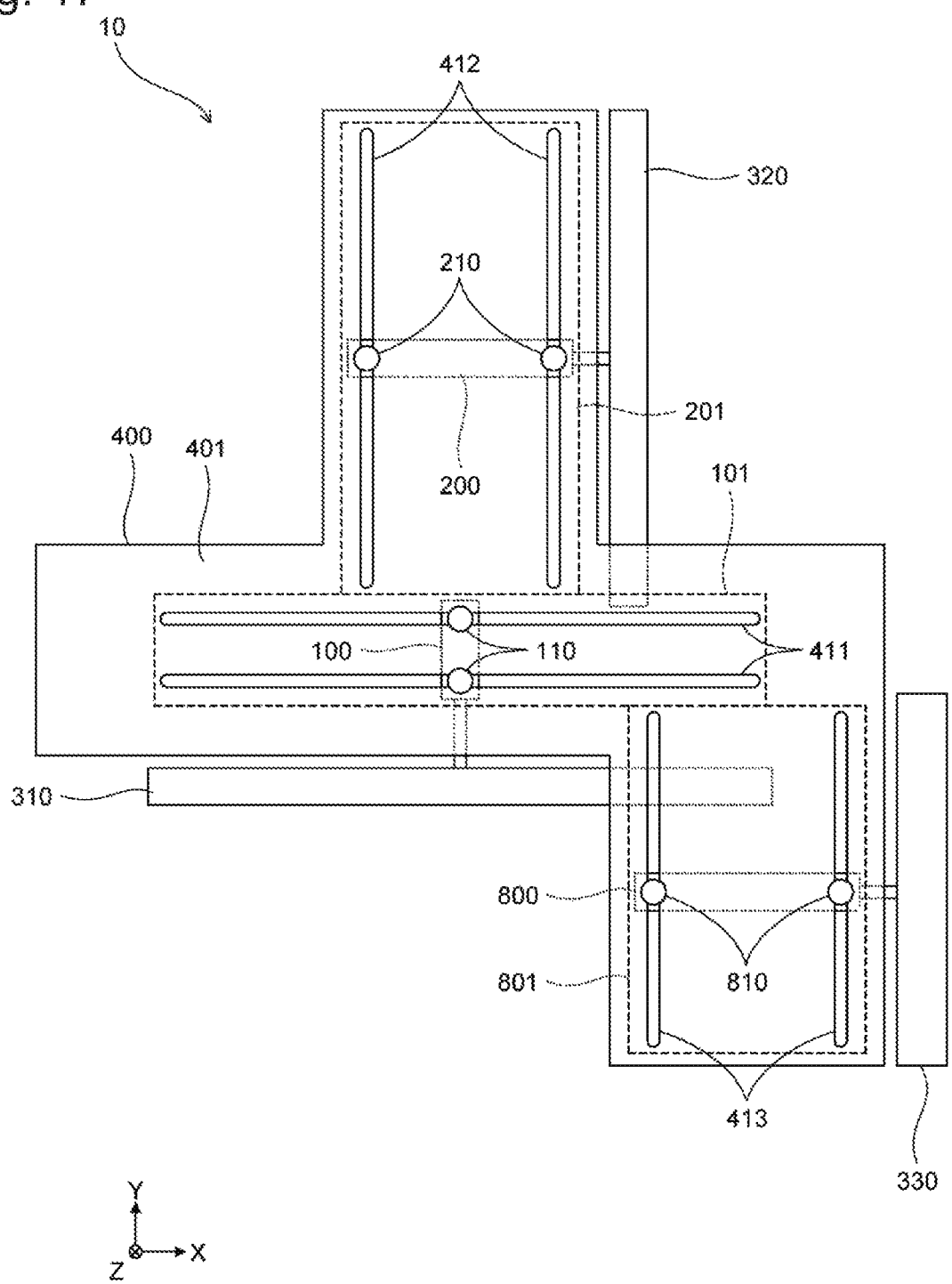
FIG. 17 is a schematic diagram illustrating a configuration where a specimen transport apparatus according to Embodiment 2 is viewed downward in the vertical direction.

As illustrated in FIG. 17, a specimen transport apparatus 10 of Embodiment 2 further includes a third transporter 330 and a third travel unit 800 when compared to the configuration of Embodiment 1 illustrated in FIG. 1A. The third transporter 330 transports third travel unit 800 in the Y-axis direction. The third travel unit 800 is positioned on the positive Z-axis side of the support plate 400 as in the case of the first travel unit 100 and the second travel unit 200. The third travel unit 800 is provided with a pair of third protrusions 810. The pair of third protrusions 810 are arranged in the X-axis direction on the third travel unit 800. A travel path 801 of the third travel unit 800 is set such that when viewed in the Z-axis direction, it does not cross the travel path 101 of the first travel unit 100 and the travel path 201 of the second travel unit 200.

In addition, in Embodiment 2, the end portion on the positive X-axis side of the support plate 400 is extended in the negative Y-axis direction compared to the configuration of Embodiment 1 illustrated in FIG. 1A. A pair of third grooves 413 are formed in the portion of the support plate 400 extended in the negative Y-axis direction. The pair of third grooves 413 extend in the Y-axis direction. The pair of third protrusions 810 protrude upward from the support surface 401 through the pair of third grooves 413.

Figure 18:
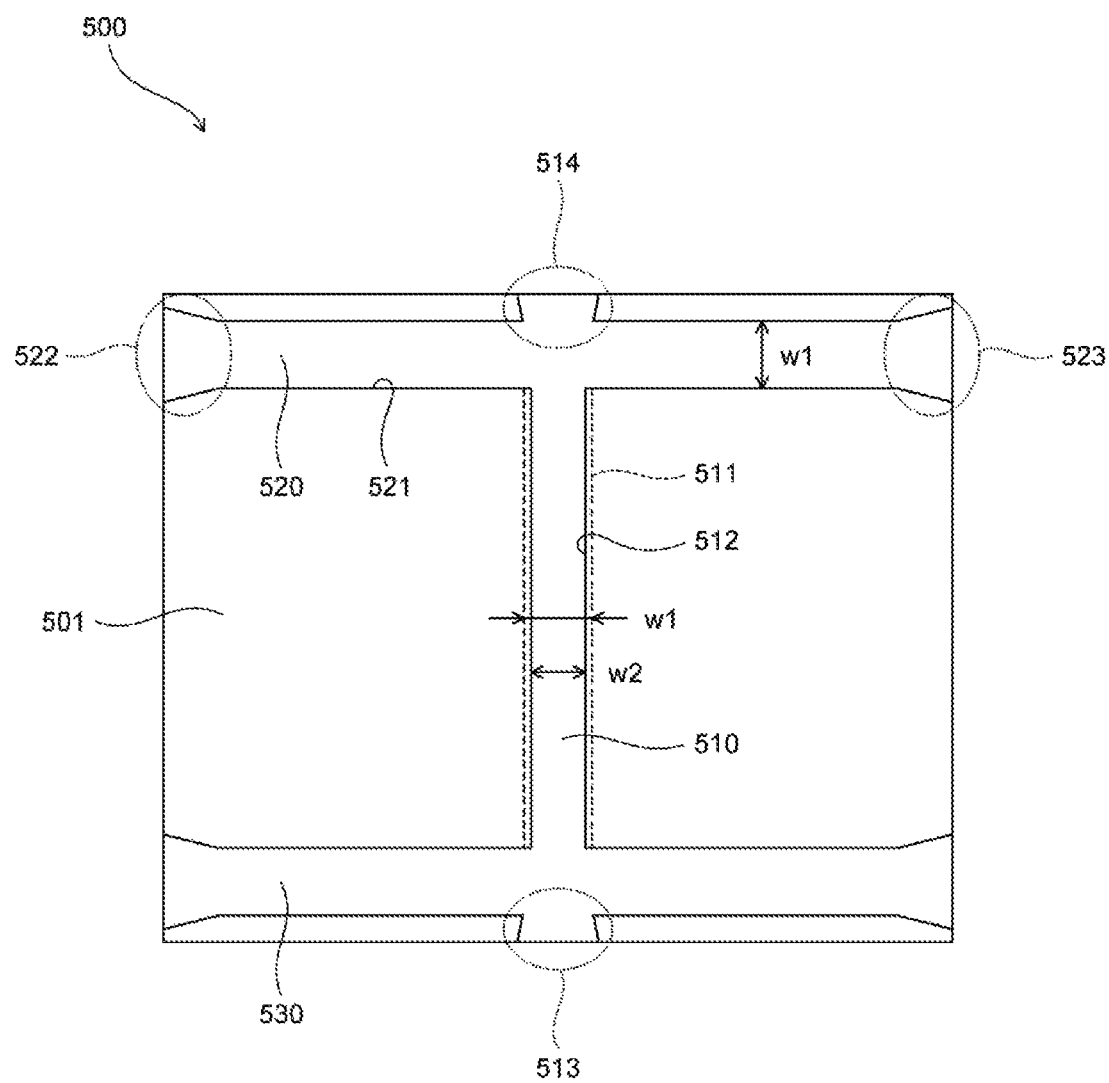
FIG. 18 is a schematic diagram illustrating a configuration where a lower surface of a holder according to Embodiment 2 is viewed in the negative Z-axis direction.
Figure 18:
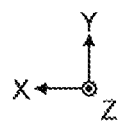

As illustrated in FIG. 18, arranged in the lower surface 501 of the holder 500 of Embodiment 2 is a third trench 530 compared to the configuration of Embodiment 1 illustrated in FIG. 5C. The third trench 530 extends parallel to the X-axis direction and is a groove formed in the lower surface 501. The third trench 530 is arranged on the negative Y-axis side of the second trench 520. To be more specific, the third trench 530 is arranged to pass near the edge portion on the negative Y-axis side of the lower surface 501. The third trench 530 engages with the third protrusions 810. Other configurations of the third trench 530 are the same as those of the second trench 520. The first trench 510 crosses the second trench 520 and the third trench 530, and is opened in the positive Y-axis direction and the negative Y-axis direction. Other configurations of Embodiment 2 are the same as those of Embodiment 1.

In Embodiment 2, the first transporter 310 transports the holder 500 in the X-axis direction and the second transporter 320 transports the holder 500 in the Y-axis direction in the same manner as Embodiment 1. In Embodiment 2, the holder 500 positioned at the position 424 by the first transporter 310 is transported in the negative Y-axis direction by the third transporter 330.

Figure 19A:
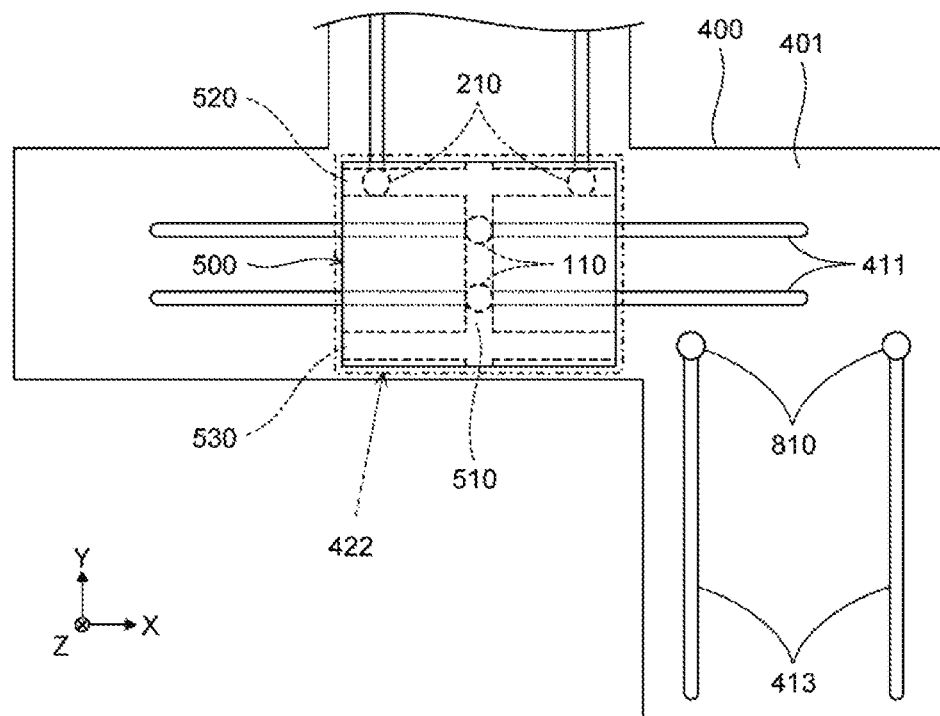
FIGS. 19A and 19B are schematic diagrams for explaining transport of the holder according to Embodiment 2.
Figure 19B:
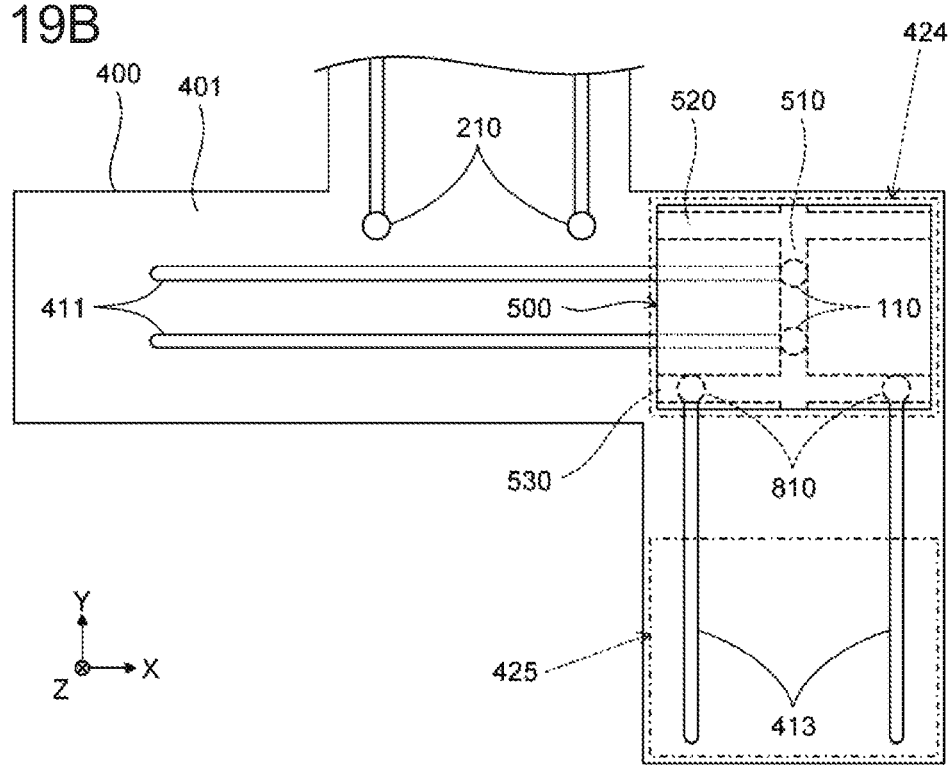

As illustrated in FIG. 19A, when the aspiration tube 710 finishes the aspiration operation, the holder 500 is transported from the position 423 to the position 422. The first protrusions 110 travel in the positive X-axis direction from the state illustrated in FIG. 19A, and as illustrated in FIG. 19B, the holder 500 at the position 422 is positioned at the position 424. Here, when the holder 500 is transported in the positive X-axis direction, the second protrusions 210 inserted in the second trench 520 are pulled out of the second trench 520. Then, the third protrusions 810 are inserted into the third trench 530.

The third protrusions 810 travel in the negative Y-axis direction from the state illustrated in FIG. 19B, and the holder 500 at the position 424 is positioned at a position 425. Here, when the holder 500 is transported in the negative Y-axis direction, the first protrusions 110 inserted in the first trench 510 are pulled out of the first trench 510.

In the transport operation performed by the second transporter 320 to transport the holder 500 in the Y-axis direction, the third trench 530 and the third protrusions 810 do not engage with each other. In the transport operation performed by the third transporter 330 to transport the holder 500 in the Y-axis direction, the second trench 520 and the second protrusions 210 do not engage with each other. This makes it possible to transport the holder 500 from the transport area in the X-axis direction toward both the positive Y-axis direction and the negative Y-axis direction, increasing the transport area of the holder 500. When the holder 500 is transported to the position 425, it is also possible to supply other apparatuses etc. at the position 425 with the plate 600 on the holder 500. In addition, an operator different from the operator who set the plate 600 at the position 421 may pick up the plate 600 on the holder 500 positioned at the position 425.

Embodiment 3

Figure 20A:
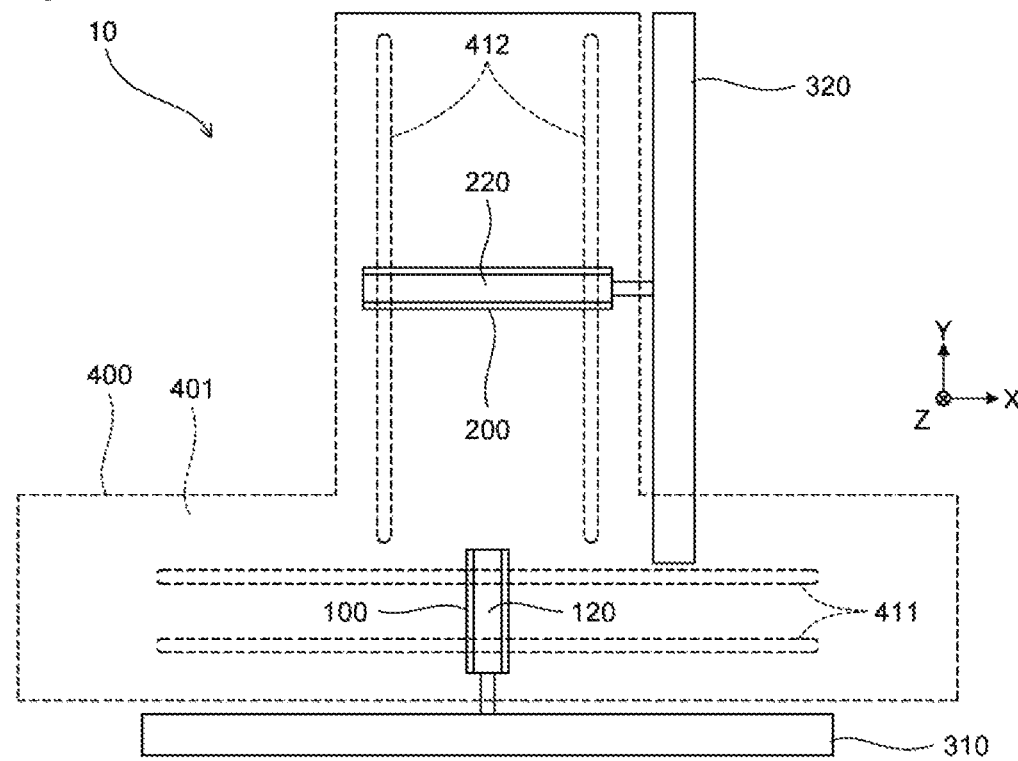
FIG. 20A is a schematic diagram illustrating a configuration where a specimen transport apparatus according to Embodiment 3 is viewed downward in the vertical direction.

As illustrated in FIG. 20A, in Embodiment 3, a first trench 120 is provided in the first travel unit 100 and a second trench 220 is provided in the second travel unit 200 compared to the configuration of Embodiment 1 illustrated in FIG. 1A. The first trench 120 is a groove extending in the Y-axis direction, and the second trench 220 is a groove extending in the X-axis direction. The first trench 120 and the second trench 220 are provided on the negative Z-axis side of the support plate 400. Note that in FIG. 20A, the support plate 400 is indicated with dashed lines for convenience.

Figure 20B:
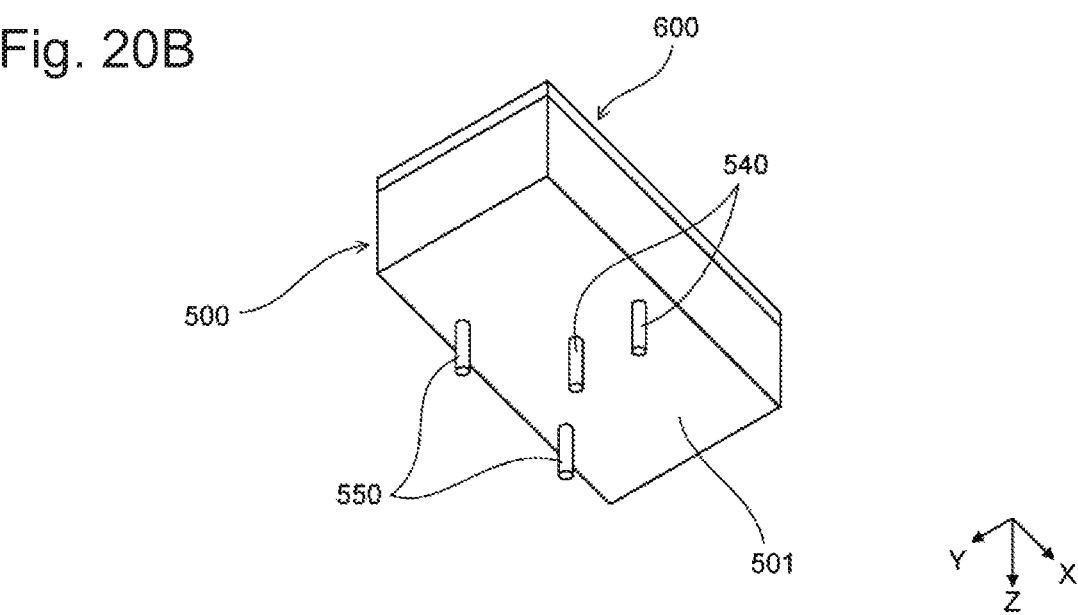
FIG. 20B is a schematic diagram illustrating a configuration where a holder on which a plate according to Embodiment 3 is set is viewed from below.

As illustrated in FIG. 20B, a pair of first protrusions 540 and a pair of second protrusions 550 are provided on the lower surface 501 of the holder 500. The pair of first protrusions 540 are arranged in the Y-axis direction, and the pair of second protrusions 550 are arranged in the X-axis direction. The pair of first protrusions 540 are provided at the middle position in the X-axis direction of the lower surface 501, and the pair of second protrusions 550 are provided near the edge portion on the positive Y-axis side of the lower surface 501. The first protrusions 540 engage with the first trench 120, and the second protrusions 550 engage with the second trench 220. Other configurations of Embodiment 3 are the same as those of Embodiment 1.

In Embodiment 3, it is possible to transport the holder 500 in the X-axis direction by transferring the first trench 120 in the X-axis direction with the first trench 120 and the first protrusions 540 in engagement with each other. Also, it is possible to transport the holder 500 in the Y-axis direction by transferring the second trench 220 in the Y-axis direction with the second trench 220 and the second protrusions 550 in engagement with each other. Hence, in Embodiment 3, it is possible to transport the holder 500 as in the case of Embodiment 1.

As described in Embodiments 1 and 3, the first trench 510 may be arranged in one of the holder 500 and the first travel unit 100, and the first protrusions 110 may be provided on the other of the holder 500 and the first travel unit 100. Similarly, the second trench 520 may be arranged in one of the holder 500 and the second travel unit 200, and the second protrusions 210 may be provided on the other of the holder 500 and the second travel unit 200. In Embodiment 2 as well, it is possible to arrange the third trench 530 in the third travel unit 800 and to provide the third protrusions 810 on the holder 500.

Note that if the first protrusions 540 and the second protrusions 550 are provided on the holder 500 as in the case of Embodiment 3, the first protrusions 540 and the second protrusions 550 might collide with and break an object after the holder 500 is detached from the specimen transport apparatus 10. For this reason, as illustrated in Embodiments 1 and 2, it is preferable to arrange the first trench 510, the second trench 520, and the third trench 530 in the holder 500, and to provide the first protrusions 110, the second protrusions 210, and the third protrusions 810 on the first travel unit 100, the second travel unit 200, and the third travel unit 800, respectively. This makes it possible to smoothly perform the work of detaching the holder 500.

Embodiment 4

Figure 21A:
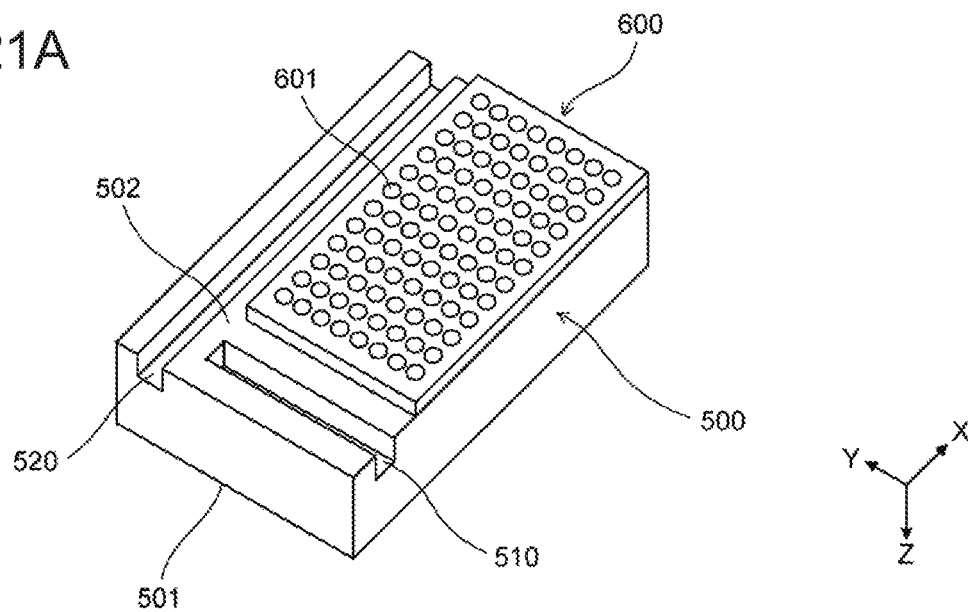
FIG. 21A is a schematic diagram illustrating a configuration where a holder on which a plate according to Embodiment 4 is set is viewed from above.

As illustrated in FIG. 21A, in Embodiment 4, the first trench 510 and the second trench 520 are arranged in the upper surface 502 of the holder 500. In Embodiment 4, the upper surface 502 is expanded in the negative X-axis direction and the positive Y-axis direction compared to the configuration of Embodiment 1 illustrated in FIG. 1B. The first trench 510 and the second trench 520 are provided in the expanded portion of the upper surface 502. Also, in Embodiment 4, the first travel unit 100 and the first protrusions 110 are set on the upper surface 502 side. Similarly, the second travel unit 200 and the second protrusions 210 are set on the upper surface 502 side. Other configurations of Embodiment 4 are the same as those of Embodiment 1.

Figure 21B:
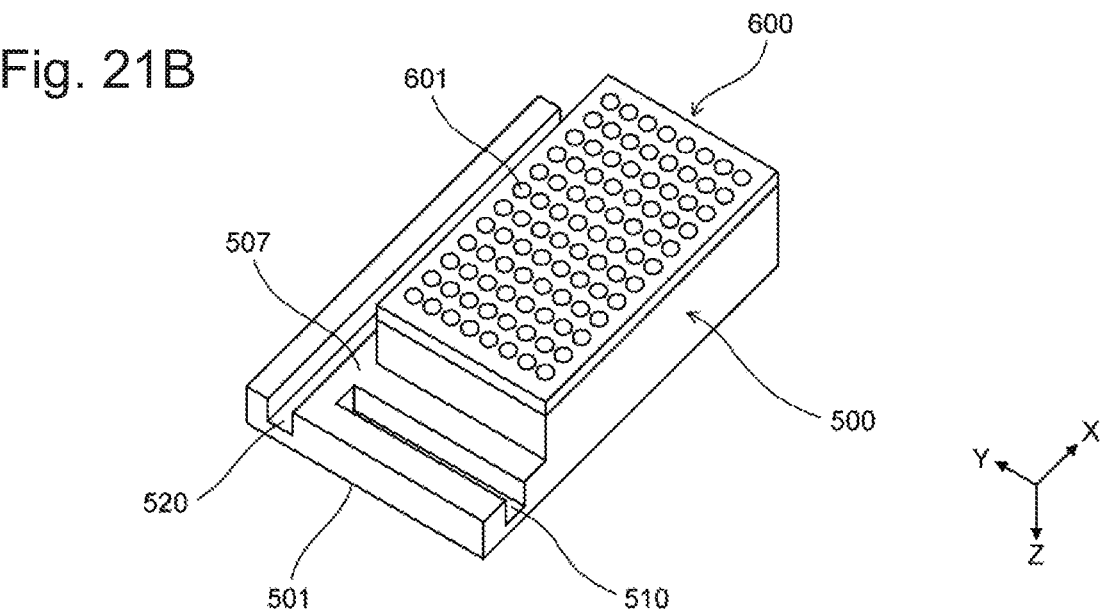
FIG. 21B is a schematic diagram illustrating a configuration where a holder on which a plate according to a modified example of Embodiment 4 is set is viewed from above.

Note that as illustrated in FIG. 21B, the first trench 510 and the second trench 520 may be arranged in an upper surface 507 provided between upper surface 502 and the lower surface 501.

In the configuration of FIGS. 21A and 21B, too, it is possible to transport the holder 500 in the X-axis direction and the Y-axis direction by causing the first protrusions 110 and the second protrusions 210 to travel, as in the case of Embodiment 1. Note that in the configuration of FIGS. 21A and 21B, the size of the holder 500 increases because the size of the holder 500 in the XY-plane increases. Moreover, the mechanism to transport the holder 500 becomes complicated because the first protrusions 110 and the second protrusions 210 are positioned on the upper side of the holder 500. Furthermore, it is impossible to pick up the holder 500 from the support surface 401 because at least one of the pair of first protrusions 110 and the pair of second protrusions 210 restrict the travel in the Z-axis direction of the holder 500.

Hence, as in Embodiment 1, it is preferable to arrange the first trench 510 and the second trench 520 in the lower surface 501 of the holder 500. If the first trench 510 and the second trench 520 are arranged in the lower surface 501, the holder 500 disposed at a predetermined position on the transport path makes it possible for the trenches and the protrusions to engage with one another. For example, in the case of Embodiment 1, it is possible to provide the holder 500 from above to the support surface 401 near the position 423. In such a manner, it is possible to simplify the configuration of the specimen transport apparatus 10 because a separate mechanism to cause the first protrusions 110 and the second protrusions 210 to travel in the Z-axis direction for engagement is unnecessary if the first trench 510 and the second trench 520 are arranged in the lower surface 501.

Note that first protrusions and second protrusions extending upward may be provided on the upper surfaces 502 and 507 of FIGS. 21A and 21B. In this case, a first trench and a second trench are arranged in the first travel unit 100 and the second travel unit 200. The first trench and the second trench are positioned on the upper side of the holder 500. Also in this case, however, the mechanism to transport the holder 500 becomes complicated, making it impossible to pick up the holder 500 from the support surface 401, as in the case of FIGS. 21A and 21B. Thus, when provided on the holder 500, it is desirable to provide the first protrusions and the second protrusions on the lower surface 501 as illustrated in FIG. 20B.

Embodiment 5

Figure 22A:
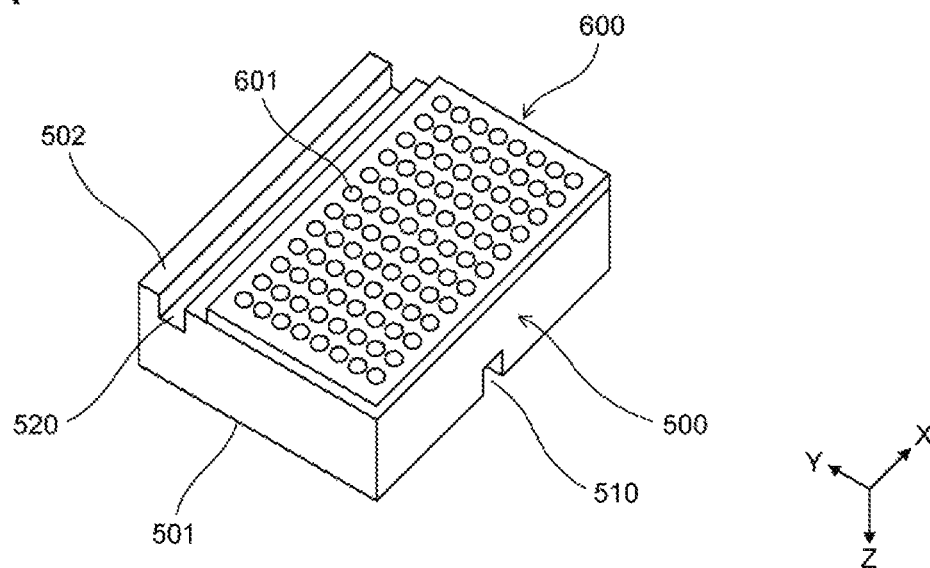
FIG. 22A is a schematic diagram illustrating a configuration where a holder on which a plate according to Embodiment 5 is set is viewed from above.

As illustrated in FIG. 22A, in Embodiment 5, the first trench 510 is arranged in the lower surface 501 of the holder 500, and the second trench 520 is arranged in the upper surface 502 of the holder 500. In Embodiment 5, the upper surface 502 is expanded in the positive Y-axis direction compared to the configuration of Embodiment 1 illustrated in FIG. 1B. The second trench 520 is provided in the expanded portion of the upper surface 502. Also, in Embodiment 5, the second travel unit 200 and the second protrusions 210 are set on the upper surface 502 side. Other configurations of Embodiment 5 are the same as those of Embodiment 1.

Figure 22B:
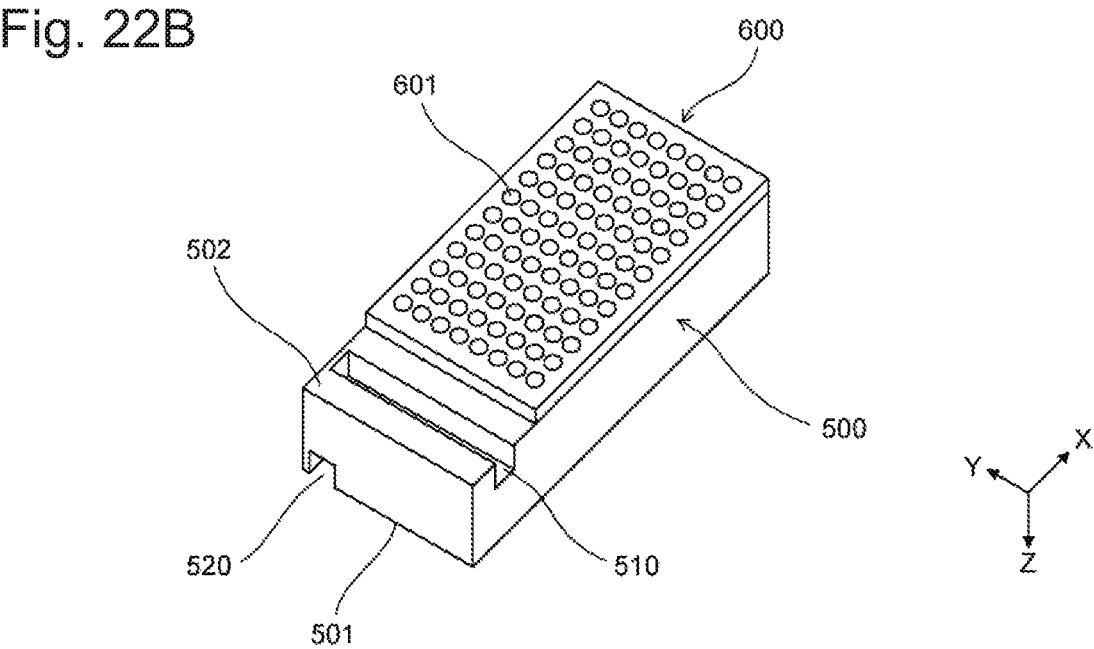
FIG. 22B is a schematic diagram illustrating a configuration where a holder on which a plate according to a modified example of Embodiment 5 is set is viewed from above.

Note that as illustrated in FIG. 22B, the first trench 510 may be arranged in the upper surface 502 of the holder 500, and the second trench 520 may be arranged in the lower surface 501 of the holder 500. In the configuration illustrated in FIG. 22B, the upper surface 502 is expanded in the negative X-axis direction compared to the configuration of Embodiment 1 illustrated in FIG. 1B. The first trench 510 is provided in the expanded portion of the upper surface 502. In this case, the first travel unit 100 and the first protrusions 110 are set on the upper surface 502 side.

In the configuration of FIGS. 22A and 22B, too, it is possible to transport the holder 500 in the X-axis direction and the Y-axis direction by causing the first protrusions 110 and the second protrusions 210 to travel, as in the case of Embodiment 1. Moreover, in the configuration of FIGS. 22A and 22B, the first travel unit 100 and the second travel unit 200 are arranged separately on the upper side and the lower side of the holder 500. Thus, the travel path 101 of the first travel unit 100 and the travel path 201 of the second travel unit 200 do not cross each other because they are shifted from each other in the Z-axis direction. Thus, it is possible to arrange the drive mechanism for the first transporter 310 and the drive mechanism for the second transporter 320 without coming into contact with each other even if the travel paths 101 and 201 are set to cross each other when viewed in the Z-axis direction.

Embodiment 6

The configuration of the Embodiments 1 to 5 described above is such that the first protrusions 110 and the second protrusions 210 engage with the gaps formed by the first trench 510 and the second trench 520, respectively. However, the gaps with which the first protrusions 110 and the second protrusions 210 engage do not necessarily have to be trenches. For example, the gaps may have the configuration illustrated in FIGS. 23A and 23B or the configuration illustrated in FIG. 23C. In both of the configuration of FIGS. 23A and 23B and the configuration of FIG. 23C, the first trench 510 and the second trench 520 are replaced by gaps compared to Embodiment 1. Other configurations are the same as those of Embodiment 1.

Figure 23A:
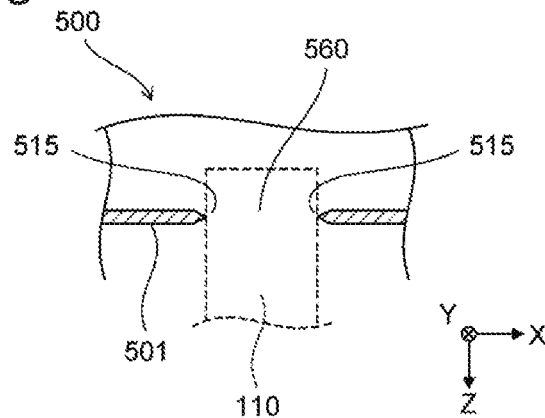
FIG. 23A is a schematic diagram illustrating a configuration where a first trench according to Embodiment 6 is viewed in the positive Y-axis direction.
Figure 23B:
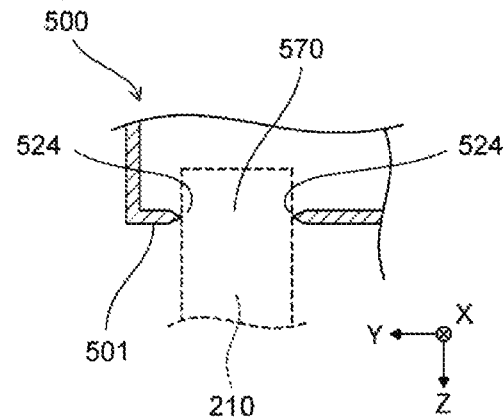
FIG. 23B is a schematic diagram illustrating a configuration where a second trench according to Embodiment 6 is viewed in the positive X-axis direction.

In the configuration illustrated in FIGS. 23A and 23B, a first gap 560 and a second gap 570 are each formed by two line-shaped parts 515 facing each other.

To be more specific, as illustrated in FIG. 23A, the lower surface 501 formed in the shape of a plate is cut out in the Y-axis direction, thereby forming the two line-shaped parts 515 facing each other. Each of the line-shaped parts 515 extends in the Y-axis direction and the width thereof in the Z-axis direction decreases toward the protrusion direction. The vertex in the protrusion direction of the line-shaped part 515 extends linearly in the Y-axis direction. The first protrusions 110 formed in the shape of a bar are inserted between the two line-shaped parts 515. The vertices of the two line-shaped parts 515 engage with the first protrusions 110. As illustrated in FIG. 23B, the lower surface 501 formed in the shape of a plate is cut out in the X-axis direction, thereby forming two line-shaped parts 524 facing each other. Each of the line-shaped parts 524 extends in the X-axis direction and the width thereof in the Z-axis direction decreases toward the protrusion direction. The vertex in the protrusion direction of the line-shaped part 524 extends linearly in the X-axis direction. The second protrusions 210 formed in the shape of a bar are inserted between the two line-shaped parts 524. The vertices of the two line-shaped parts 524 engage with the second protrusions 210.

Figure 23C:
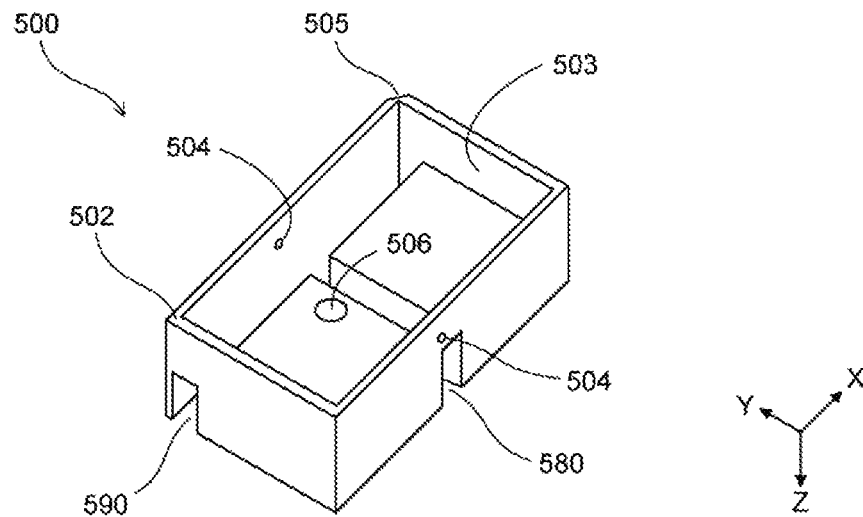
FIG. 23C is a schematic diagram illustrating a configuration where a holder according to Embodiment 6 is viewed from above.

In the configuration illustrated in FIG. 23C, the first gap 580 and the second gap 590 penetrate the holder 500 in the Z-axis direction. In this case, each of the first gap 580 and the second gap 590 is an opening without a bottom, not a trench with a bottom as illustrated in FIGS. 5A and 5B.

In both of the configuration of FIGS. 23A and 23B and the configuration of FIG. 23C, it is possible to engage the first protrusions 110 with the first gaps 560 and 580 and to engage the second protrusions 210 with the second gaps 570 and 590. Hence, it is possible to transport the holder 500 in the XY-plane as in the case of Embodiment 1.

Embodiment 7

Figure 23D:
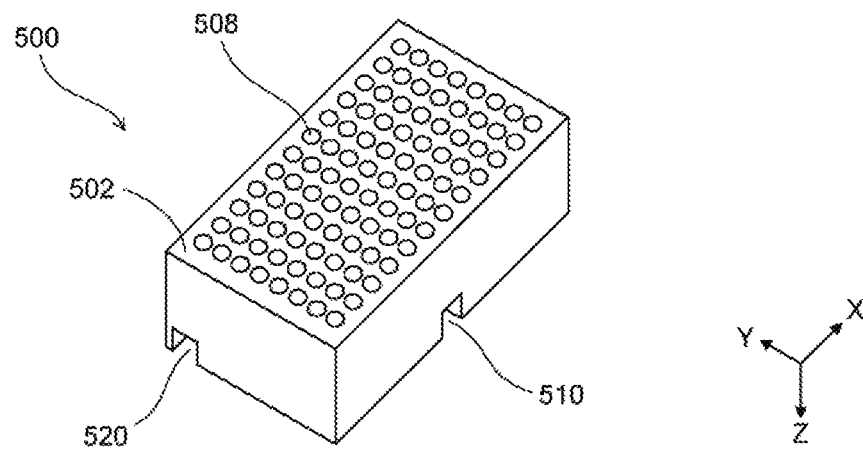
FIG. 23D is a schematic diagram illustrating a configuration where a holder according to Embodiment 7 is viewed from above.
Figure 24:
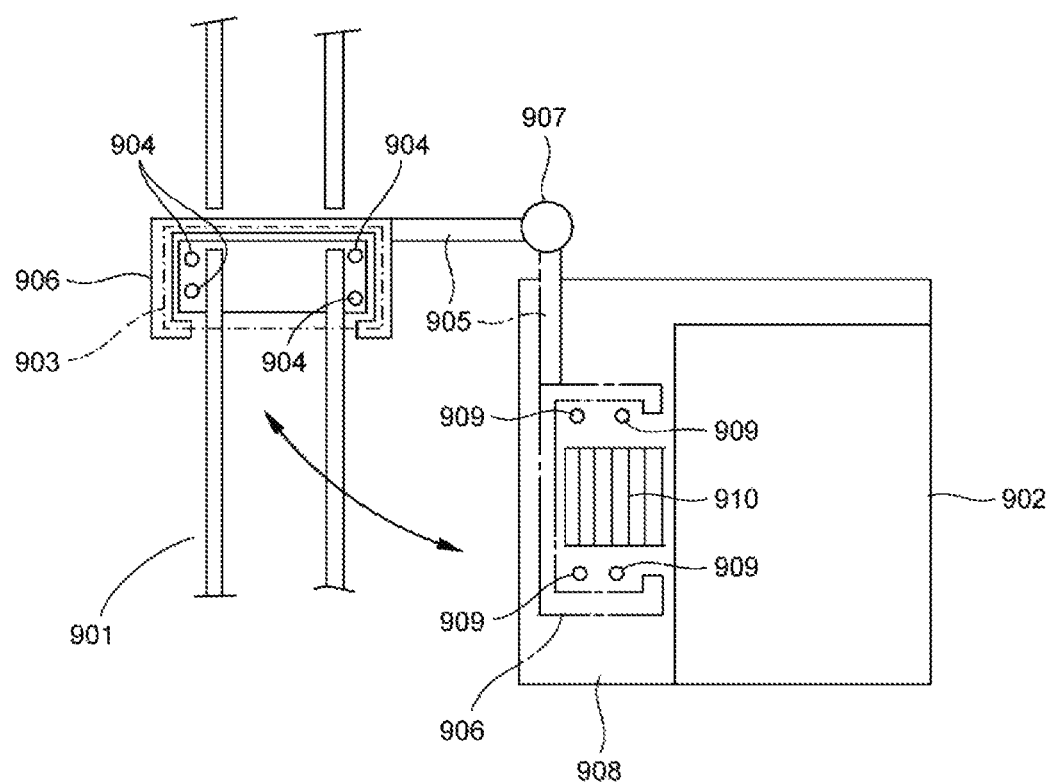
FIG. 24 is a schematic diagram for explaining a configuration according to related art.

As illustrated in FIG. 23D, in Embodiment 7, the hollow portion 503, the holes 504, the chamfer 505, and the hole 506 of the holder 500 are omitted compared to the configuration of Embodiment 1 illustrated in FIG. 7A. Instead, wells 508 are formed in the upper surface 502 in a matrix form. As in the case of the wells 601 of the plate 600, 96 wells 508 are formed in the upper surface 502.

The above-described configuration of the holder 500 makes it possible to omit the plate 600. Note that in Embodiment 7, however, the operator has to open the cover part 11 and then drip the specimen directly into the wells 508 of the holder 500 positioned at the positions 421 and 422. Alternatively, the operator has to detach the holder 500 on the support surface 401, put the specimen into the wells 508 at another place, and then set the holder 500 onto the support surface 401 again. Hence, it is preferable to use the plate 600 to hold the specimen as in Embodiment 1 from the viewpoint of reducing the complexity of work.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A specimen transport apparatus comprising:
   a holder which includes a first trench and a second trench extending in a direction different from an extension direction of the first trench and which is configured to hold a specimen;
   a first transporter which includes a first protrusion to engage with the first trench and which is configured to transport the holder by transferring the first protrusion in engagement with the first trench in the extension direction of the second trench;
   a second transporter which includes a second protrusion to engage with the second trench and which is configured to transport the holder by transferring the second protrusion in engagement with the second trench in the extension direction of the first trench, wherein
   the first trench is formed in at least one of an upper surface or a lower surface of the holder,
   the second trench is formed in at least one of the upper surface or the lower surface of the holder, and is formed to extend to a lateral surface of the holder,
   the second transporter positions the second protrusion at a position where the second protrusion slides in the second trench as the first transporter transports the holder in the extension direction of the second trench, thereby engaging the second protrusion with the second trench, and
   the second transporter transports the holder by transferring the second protrusion, engaged with the second trench, in the extension direction of the first trench so as to let the first protrusion slide out of the first trench.

2. The specimen transport apparatus according to claim 1, wherein
   the first trench extends to the lateral surface of the holder such that the first protrusion slides out of the first trench in a transport operation to transport the holder in the extension direction of the first trench.

3. The specimen transport apparatus according to claim 1, wherein
   the second trench extends to the lateral surface of the holder such that the second protrusion slides out of the second trench in a transport operation to transport the holder in the extension direction of the second trench.

4. The specimen transport apparatus according to claim 1, wherein
   a width of the second trench increases, at least at an opened end portion of the second trench, toward the lateral surface of the holder in the extension direction of the second trench.

5. The specimen transport apparatus according to claim 3, wherein
   a width of the first trench increases, at least at an opened end portion of the first trench, toward the lateral surface of the holder in the extension direction of the first trench.

6. The specimen transport apparatus according to claim 1, wherein
the first trench and the second trench are arranged in the lower surface of the holder.

7. The specimen transport apparatus according to claim 1, wherein
the first protrusion includes a wide portion which has a width larger than a proximal side of the first protrusion, and
the first trench includes a first width portion which receives the wide portion and a second width portion which is positioned opposite to the first width portion and near the proximal side of the first protrusion and which has a width smaller than the wide portion.

8. The specimen transport apparatus according to claim 1, wherein
a shape of each of the first protrusion and the second protrusion is circular.

9. The specimen transport apparatus according to claim 1, wherein
the first protrusion and the second protrusion are each configured to be rotatable in a circumferential direction.

10. The specimen transport apparatus according to claim 1, wherein
a portion of the first protrusion to be inserted into the first trench has a maximum width that is substantially the same as a width of the first trench, and
a portion of the second protrusion to be inserted into the second trench has a maximum width that is substantially the same as a width of the second trench.

11. The specimen transport apparatus according to claim 1, wherein
a travel path of the first protrusion and a travel path of the second protrusion are set not to cross each other in a plan view.

12. The specimen transport apparatus according to claim 1, wherein
the holder includes a third trench which extends in the same direction as the second trench,
the specimen transport apparatus comprises a third transporter which transports the holder by transferring a third protrusion in engagement with the third trench in the extension direction of the first trench, and
the third trench extends to the lateral surface of the holder such that the third protrusion enters the third trench in a transport operation to transport the holder in the extension direction of the second trench using the first protrusion.

13. The specimen transport apparatus according to claim 12, wherein
the first trench extends to the lateral surface of the holder such that the first protrusion slides out of the first trench in the transport operation to transport the holder using the third protrusion.

14. The specimen transport apparatus according to claim 1, comprising
a planar support surface which is provided in a travel range of the holder, and on which the lower surface of the holder is mounted.

15. The specimen transport apparatus according to claim 1, wherein
the upper surface of the holder comprises a chamfer so that a plate with weds formed in a matrix form is mountable on and fits the upper surface of the holder.

16. The specimen transport apparatus according to claim 1, wherein
the upper surface of the holder is formed with wells in a matrix form.

17. The specimen transport apparatus according to claim 1, wherein
the upper surface of the holder is formed with a hole to set a specimen container therein.

18. The specimen transport apparatus according to claim 17, wherein
the upper surface of the holder includes an identification sign attached thereon to identify the specimen in the specimen container set in the hole.

19. A specimen measurement apparatus comprising:
the specimen transport apparatus according to claim 1;
an aspiration unit which aspirates the specimen transported by the holder; and
a measurement unit which measures the specimen aspirated by the aspiration unit.

20. The specimen measurement apparatus according to claim 19, wherein
the holder is formed with wells in which the specimen can be stored such that the wells are arranged in the extension direction of the second trench and in the extension direction of the first trench in a matrix form,
the aspiration unit includes
an aspiration tube which aspirates the specimen and
a transfer unit which transfers the aspiration tube in the extension direction of the second trench; and
the specimen transport apparatus aligns the wells arranged in the extension direction of the second trench with a transfer path of the aspiration tube by transporting the holder using the first transporter and the second transporter.

21. A specimen transport method transporting a holder by the transport apparatus of claim 1, the method comprising:
transporting the holder holding the specimen in the extension direction of the second trench provided in the upper surface or the lower surface of the holder by causing the first protrusion to travel in the extension direction of the second trench with the first protrusion engaged with the first trench provided in the upper surface or the lower surface of the holder, and thereby inserting the second protrusion into the second trench along the extension direction of the second trench; and
transporting the holder in the extension direction of the first trench by causing the second protrusion to travel in the extension direction of the first trench.

22. The specimen transport method according to claim 21, wherein
in transporting the holder in the extension direction of the first trench; the first protrusion slides out of the first trench.

* * * * *